United States Patent
Goldberg et al.

(10) Patent No.: US 11,199,472 B2
(45) Date of Patent: *Dec. 14, 2021

(54) FIXTURELESS LENSMETER SYSTEM

(71) Applicant: Warby Parker Inc., New York, NY (US)

(72) Inventors: David Howard Goldberg, New York, NY (US); Joseph Carrafa, Brooklyn, NY (US)

(73) Assignee: Warby Parker Inc., New York, NY (US)

( * ) Notice: Subject to any disclaimer, the term of this patent is extended or adjusted under 35 U.S.C. 154(b) by 8 days.

This patent is subject to a terminal disclaimer.

(21) Appl. No.: 16/722,528

(22) Filed: Dec. 20, 2019

(65) Prior Publication Data

US 2020/0124496 A1 Apr. 23, 2020

Related U.S. Application Data

(63) Continuation of application No. 16/164,488, filed on Oct. 18, 2018, now Pat. No. 10,557,773, which is a (Continued)

(51) Int. Cl.
*G01M 11/02* (2006.01)

(52) U.S. Cl.
CPC .... *G01M 11/0228* (2013.01); *G01M 11/0235* (2013.01); *G01M 11/0242* (2013.01); *G01M 11/0264* (2013.01)

(58) Field of Classification Search
CPC ............. G01M 11/02; G01M 11/0207; G01M 11/0214; G01M 11/0221; G01M 11/0228;
(Continued)

(56) References Cited

U.S. PATENT DOCUMENTS

| 2,818,775 | A | 1/1958 | Ullrich |
| 4,007,990 | A | 2/1977 | McDevitt, Jr. et al. |

(Continued)

FOREIGN PATENT DOCUMENTS

| DE | 19632829 A1 | 3/1997 |
| DE | 102007057260 A1 | 6/2009 |

(Continued)

OTHER PUBLICATIONS

Extended European Search Report for EP 17800076.6-1001 dated Jan. 14, 2020, 7 pages.

(Continued)

*Primary Examiner* — Gordon J Stock, Jr.
(74) *Attorney, Agent, or Firm* — Duane Morris LLP

(57) ABSTRACT

A lensmeter system may include a mobile device having a camera. The camera may capture a first image of a pattern through a lens that is separate from the camera, while the lens is in contact with a pattern. The mobile device may determine the size of the lens based on the first image and known features of the pattern. The camera may capture a second image of the pattern, while the lens is at an intermediate location between the camera and the pattern. The second image may be transformed to an ideal coordinate system, and processed determine a distortion of the pattern attributable to the lens. The mobile device may measure characteristics of the lens based on the distortion. Characteristics of the lens may include a spherical power, a cylinder power, and/or an astigmatism angle.

18 Claims, 12 Drawing Sheets

Related U.S. Application Data continuation-in-part of application No. 16/022,324, filed on Jun. 28, 2018, now Pat. No. 10,533,925, which is a continuation of application No. 15/157,835, filed on May 18, 2016, now Pat. No. 10,036,685.

(58) Field of Classification Search
CPC ......... G01M 11/0235; G01M 11/0242; G01M 11/025; G01M 11/0257; G01M 11/0264; G01B 11/08
See application file for complete search history.

(56) References Cited

U.S. PATENT DOCUMENTS

| | | | |
|---|---|---|---|
| 4,070,115 A | 1/1978 | Humphrey | |
| 4,090,790 A | 5/1978 | Dragon et al. | |
| 4,779,979 A | 10/1988 | Iwane | |
| 5,247,341 A | 9/1993 | Kurachi et al. | |
| 5,307,141 A | 4/1994 | Fujieda | |
| 5,379,111 A | 1/1995 | Kajino et al. | |
| 5,414,505 A | 5/1995 | Ikezawa et al. | |
| 5,489,978 A | 2/1996 | Okumura et al. | |
| 5,521,700 A | 5/1996 | Kajino et al. | |
| 5,621,564 A | 4/1997 | Kageyama et al. | |
| 5,657,710 A | 8/1997 | Foster et al. | |
| 5,682,234 A | 10/1997 | Kajino | |
| 5,684,576 A | 11/1997 | Kajino et al. | |
| 5,855,074 A | 1/1999 | Abitbol et al. | |
| 6,056,633 A | 5/2000 | Sesena et al. | |
| 6,496,253 B1 | 12/2002 | Vokhmin | |
| 6,621,564 B2 | 9/2003 | Akiyama | |
| 6,657,710 B2 | 12/2003 | Kajino | |
| 6,972,837 B2 | 12/2005 | Kajino | |
| 7,209,224 B2 | 4/2007 | Kajino | |
| 7,245,362 B2 | 7/2007 | Kobayashi et al. | |
| 7,609,371 B2 | 10/2009 | Kajino | |
| 7,733,468 B2 | 6/2010 | Kajino | |
| 7,742,158 B2 | 6/2010 | Divo et al. | |
| 8,789,945 B2 | 7/2014 | Suzaki et al. | |
| 9,019,485 B2 | 4/2015 | Ignatovich et al. | |
| 9,228,920 B2 | 1/2016 | Blonde | |
| 9,549,669 B2 | 1/2017 | Limon | |
| 9,778,136 B2 | 10/2017 | Suzuki et al. | |
| 10,036,685 B2 | 7/2018 | Goldberg | |
| 10,321,820 B1 | 6/2019 | Gollier | |
| 10,330,566 B2 | 6/2019 | Hofmann et al. | |
| 10,557,773 B2 * | 2/2020 | Goldberg | G01M 11/0242 |
| 2016/0223429 A1 | 8/2016 | Fecnher et al. | |
| 2017/0076523 A1 | 3/2017 | Rumble et al. | |
| 2017/0079523 A1 | 3/2017 | Limon | |
| 2017/0322110 A1 | 11/2017 | Conrad | |
| 2018/0038768 A1 * | 2/2018 | Hofmann | G01M 11/0228 |
| 2018/0120198 A1 | 5/2018 | Glasenapp | |
| 2018/0224675 A1 | 8/2018 | Gueu | |
| 2019/0072455 A1 * | 3/2019 | Limon | G06K 9/00624 |

FOREIGN PATENT DOCUMENTS

| | | |
|---|---|---|
| EP | 0558015 A2 | 9/1993 |
| GB | 1042954 A | 9/1966 |
| WO | WO-2016/076530 A1 | 5/2016 |
| WO | WO-2016/181308 A1 | 11/2016 |
| WO | WO-2016/181309 A1 | 11/2016 |
| WO | WO-2016/181310 A1 | 11/2016 |
| WO | 2017125902 A1 | 7/2017 |

OTHER PUBLICATIONS

International Search Report and Written Opinion from PCT/US2017/033064, dated Aug. 11, 2017, 12 pages.

Notification of Transmittal of the International Search Report and the Written Opinion of the International Searching Authority, or the Declaration, for PCT/US2019/056827, dated Jan. 22, 2020, 12 pages.

* cited by examiner

FIXTURELESS LENSMETER SYSTEM

CROSS-REFERENCE TO RELATED APPLICATIONS

This application is a Continuation of U.S. patent application Ser. No. 16/164,488, filed Oct. 18, 2018, which is a Continuation-in-Part of U.S. patent application Ser. No. 16/022,324, filed on Jun. 28, 2018, which is a Continuation of U.S. patent application Ser. No. 15/157,835 filed on May 18, 2016 and issued as U.S. Pat. No. 10,036,685 on Jul. 31, 2018, each of which is hereby incorporated by reference herein in its entirety.

BACKGROUND

Technical Field

The technical field generally relates to determining prescriptions of corrective lenses, and more particularly, in one aspect, to mobile device lensmeters and methods of operating such lensmeters.

BACKGROUND DISCUSSION

Eye doctors, eyeglass lens makers, and others who work with lenses often use traditional lensmeters to determine the prescription (including the spherical power, cylinder power, and axis) of an unknown corrective lens. Such lensmeters typically involve shining a light source through a pattern and a corrective lens mounted on a fixture of the lensmeter, and viewing the light at an eyepiece opposite the light source. Observing the pattern's distorted appearance through the eyepiece, the distortion can be correlated to a prescription known to create such a distortion.

A fixture holds the pattern, the corrective lens, and the eyepiece in an appropriate spacing and configuration to one another. Yet the fixture is typically large and heavy, making such an arrangement unwieldy and undesirable for use at home or in the field. Such traditional methods of determining a prescription for a corrective lens also do not provide a convenient way to convey the prescription information to others, such as an eye doctor or lens maker. While the information may be conveyed by telephone, for example, the risk of transcription error or other issues rises, making it less attractive for individuals to determine a corrective lens prescription in a convenient setting, such as home or work. Those seeking to determine a prescription of an unknown corrective lens must therefore travel to an eye doctor or other professional, which introduces additional delays and costs to the process.

SUMMARY

According to one aspect, a process for determining characteristics of a lens includes obtaining a captured image of a pattern through a corrective lens; transforming the captured image to an ideal coordinate system; processing the captured image to determine an overall distortion from a reference pattern to the pattern of the captured image; determining a distortion of the captured pattern attributable to the corrective lens; and measuring at least one characteristic of the corrective lens. According to one embodiment, the captured image includes a first region containing the pattern and created by light passing through the corrective lens, and a second region created by light not passing through the corrective lens, and determining the distortion of the captured pattern attributable to the corrective lens is performed at least in part with reference to the second region. According to a further embodiment, the pattern is a checkerboard pattern, and the second region contains a border. According to another embodiment, transforming the captured image to an ideal coordinate system includes detecting a plurality of captured reference landmarks in the second region of the captured image; determining a transformation from a plurality of ideal reference landmarks to the plurality of captured reference landmarks; and applying the transformation to the captured image.

According to another embodiment, the pattern is a first pattern and the corrective lens is a first corrective lens, and obtaining the captured image of the pattern through the corrective lens includes obtaining a captured image of the first pattern through the first corrective lens and a second pattern through the second lens.

According to yet another embodiment, processing the captured image to determine the overall distortion from the reference pattern to the pattern of the captured image includes detecting, in the captured image, a plurality of captured pattern landmarks; determining a transformation from a plurality of ideal pattern landmarks to the plurality of captured pattern landmarks; and determining for the corrective lens, from the transformation, a spherical power measurement, a cylinder power measurement, and an astigmatism angle measurement. According to a further embodiment, the transformation is a dioptric power matrix.

According to yet a further embodiment, obtaining the captured image of the at least one pattern through the corrective lens is performed at a first location of a camera lens relative to the at least one pattern, further including capturing, at a second location of the camera lens relative to the at least one pattern, a second captured image of the at least one pattern through the corrective lens; detecting, in the second captured image, the plurality of captured pattern landmarks; determining a second transformation from the plurality of ideal pattern landmarks to the plurality of captured pattern landmarks; determining, for the corrective lens, from the second transformation, the spherical power measurement, the cylinder power measurement, and the astigmatism angle measurement; and selecting a preferred transformation from the first transformation and the second transformation for which the spherical power measurement and the cylinder power measurement have an extreme value.

According to a still further embodiment, the captured image is captured by a camera having a camera lens, and the corrective lens is positioned at a known location relative to the camera lens and the pattern. According to a further embodiment, determining the distortion of the captured image attributable to the corrective lens includes determining a distance between the camera lens and the pattern; and determining at least one focal length of the corrective lens with reference to the distance, the spherical power measurement, and the cylinder power measurement.

According to one embodiment, measuring the at least one characteristic of the corrective lens includes determining a prescription of the corrective lens, the prescription including at least a sphere value, a cylinder value, and an axis value. According to another embodiment, obtaining a captured image of a pattern through a corrective lens includes obtaining, through a camera lens, a captured image of a first pattern through a first corrective lens and a second pattern through a second corrective lens, wherein the two patterns are spaced from each other such that obtaining the captured image of the first pattern through the first corrective lens and the second pattern through the second corrective lens can be performed when the first corrective lens and the second corrective lens are positioned at a known location relative to the camera lens and the first and second patterns.

According to yet another embodiment, the process further includes determining, from the captured image, a first location of a camera lens of a lensmeter through which the captured image was captured; identifying a direction to a second location relative to the first location; guiding a user of the lensmeter to the second location; and capturing a second captured image of the pattern through the corrective lens.

According to another aspect, a lensmeter includes a camera; a visual display; and a processor coupled to the camera and configured to obtain a captured image of a pattern through a corrective lens; transform the captured image to an ideal coordinate system; process the captured image to determine an overall distortion from a reference pattern to the pattern of the captured image; determine a distortion of the captured pattern attributable to the corrective lens; and measure at least one characteristic of the corrective lens.

According to one embodiment, the captured image includes a first region containing the pattern and created by light passing through the corrective lens, and a second region created by light not passing through the corrective lens. According to a further embodiment, the processor is further configured to transform the captured image to an ideal coordinate system by being configured to detect a plurality of captured reference landmarks in the second region of the captured image; determine a transformation from a plurality of ideal reference landmarks to the plurality of captured reference landmarks; and apply the transformation to the captured image.

According to another embodiment, the processor is further configured to process the captured image to determine the overall distortion from the reference pattern to the pattern of the captured image by being configured to detect, in the captured image, a plurality of captured pattern landmarks; determine a transformation from a plurality of ideal pattern landmarks to the plurality of captured pattern landmarks; and determine for the corrective lens, from the transformation, a spherical power measurement, a cylinder power measurement, and an astigmatism angle measurement. According to a further embodiment, the processor is further configured to obtain the captured image of the at least one pattern through the corrective lens at a first location, the processor further configured to capture, at a second location, a second captured image of the at least one pattern through the corrective lens; detect, in the second captured image, the plurality of captured pattern landmarks; determine a second transformation from the plurality of ideal pattern landmarks to the plurality of captured pattern landmarks; determine, for the corrective lens, from the second transformation, the spherical power measurement, the cylinder power measurement, and the astigmatism angle measurement; and select a preferred transformation from the first transformation and the second transformation for which the spherical power measurement and the cylinder power measurement have an extreme value. According to yet a further embodiment, the captured image is captured through a camera lens of the camera, and the processor is further configured to determine the distortion of the captured image attributable to the corrective lens by being configured to determine a distance between the camera lens and the pattern; and determine at least one focal length of the corrective lens with reference to the distance, the spherical power measurement, and the cylinder power measurement.

According to one embodiment, the processor is further configured to measure the at least one characteristic of the corrective lens by being configured to determine a prescription of the corrective lens, the prescription including at least a sphere value, a cylinder value, and an axis value. According to another embodiment, the pattern is printed on a physical medium. According to yet another embodiment, the pattern is displayed on an electronic display device.

According to some aspects, a method of operating a lensmeter system is provided, the method including capturing, with a camera of the lensmeter system, a first image of a pattern through a corrective lens that is in contact with the pattern. The method also includes determining, with a computing device of the lensmeter system, a size of the corrective lens based on the first image and the pattern. The method also includes capturing, with the camera, a second image of the pattern through the corrective lens while the corrective lens is at an intermediate position between the camera and the pattern. The method also includes determining, with the computing device, a distortion, attributable to the corrective lens, of the pattern in the second image, using the determined size of the corrective lens. The method also includes measuring, with the computing device, at least one characteristic of the corrective lens based on the determined distortion.

According to other aspects, a mobile device is provided that includes a camera and a processor configured to obtain, from the camera, a first image of a pattern through a corrective lens that is in contact with the pattern. The processor is further configured to determine a size of the corrective lens based on the first image and the pattern. The processor is further configured to obtain, from the camera, a second image of the pattern through the corrective lens with the corrective lens at an intermediate position between the camera and the pattern. The processor is further configured to determine a distortion, attributable to the corrective lens, of the pattern in the second image, using the determined size of the corrective lens. The processor is further configured to measure at least one characteristic of the corrective lens based on the determined distortion.

According to other aspects a lensmeter system is provided that includes a pattern having features with sizes, and a mobile device. The mobile device includes a camera, memory storing information associated with the pattern and the sizes of the features, and a processor configured to capture, using the camera, a first image of a pattern through a corrective lens that is in contact with the pattern. The processor is further configured to determine a size of the corrective lens based on the first image and the pattern using the information associated with the pattern and the sizes of the features. The processor is further configured to capture, using the camera, a second image of the pattern through the corrective lens while the corrective lens is at an intermediate position between the camera and the pattern. The processor is further configured to determine a distortion, attributable to the corrective lens, of the pattern in the second image, using the determined size of the corrective lens. The processor is further configured to measure at least one characteristic of the corrective lens based on the determined distortion.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed subject matter. Particular references to examples and embodiments, such as "an embodiment," "an example," "one example," "another embodiment," "another example," "some embodiments," "some examples," "other embodiments," "an alternate embodiment," "various embodiments," "one embodiment," "at least one embodiments," "this and other embodiments" or the like, are not necessarily mutually exclusive and are intended to indicate that a particular feature, structure, or characteristic described in connection with the embodiment or example and may be included in that embodiment or example and other embodiments or examples. The appearances of such terms herein are not necessarily all referring to the same embodiment or example.

Furthermore, in the event of inconsistent usages of terms between this document and documents incorporated herein by reference, the term usage in the incorporated references is supplementary to that of this document; for irreconcilable inconsistencies, the term usage in this document controls. In addition, the accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
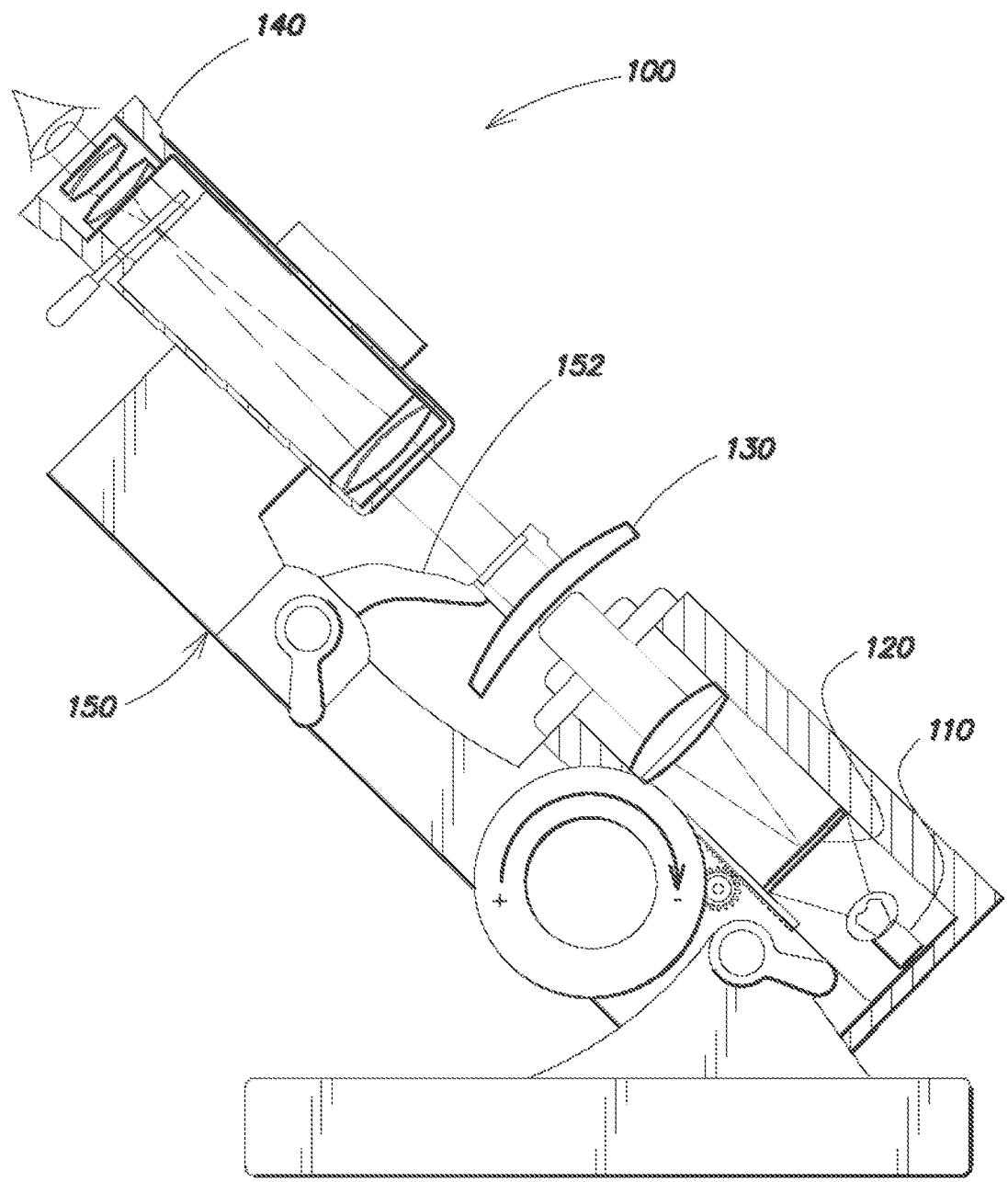
FIG. 1 is an illustration of a prior art lensmeter.

According to one or more embodiments, the processes and systems disclosed allow a lensmeter device such as a mobile phone to determine characteristics, such as a prescription, of one or more corrective lenses. In some embodiments, an image of one or more patterns is captured through the corrective lens by a camera device, and the distortion of the patterns is measured to determine the characteristics of the corrective lens by a connected computing device with specialized software. Embodiments discussed herein describe a lensmeter as a device configured to measure characteristics of one or more corrective lenses without requiring the specific spacing and arrangement required by known lensmeters and enforced by the fixtures they incorporate. The present lensmeter may be a smartphone or tablet device on which specialized software (e.g., an app) is installed for performing the claimed methods. In some operational scenarios, all of the processing for determining the characteristics of the corrective lens are performed at the smartphone or the tablet (e.g., by the processor(s) of the smartphone or the tablet). In other operational scenarios, data such as camera images or image metadata may be communicated between the smartphone or the tablet and one or more remote processors such as one or more cloud servers that perform some or all of the processing for determining the characteristics of the corrective lens. In these other operational scenarios, information indicating the determined characteristics can be communicated from the remote processor(s) to the smartphone, the tablet, and/or other devices or systems. In some implementations, the lensmeter may include one or more components that have a fixed location (e.g., a camera embedded in a wall or fixture and communicatively coupled to one or more local and/or remote processors) and that can measure characteristics of corrective lenses without requiring the corrective lens and the pattern to be precisely spaced and arranged relative to the lensmeter. Such an arrangement may be suitable, for example, in a retail environment, such as an optician location or eyeglass retailer.

The patterns may be displayed on a piece of paper, or may be displayed on a display of another device, such as a laptop computer. In some embodiments, the mobile device (i.e., the mobile lensmeter) and other devices (e.g., the other device displaying the pattern) may be paired, to allow the devices to communicate and interact during the measurement process. Examples herein depicting the mobile lensmeter as the mobile device itself are for illustrative purposes only, and it will be appreciated that functionality discussed herein with respect to the "mobile lensmeter" may be performed on, or in conjunction with, such other devices as part of a mobile lensmeter system.

In some embodiments, two patterns are spaced and configured such that they are visible to the mobile lensmeter—each through one of a pair of corrective lenses in an eyeglass frame—when the corrective lenses are positioned approximately halfway between the patterns and the lensmeter and oriented appropriately. Such an arrangement allows for easy, intuitive positioning of the mobile lensmeter, the patterns, and the corrective lenses. Furthermore, the mobile lensmeter is configured to determine the distance to the pattern and take that measurement into account when determining the prescription. This design facilitates the manual positioning of the elements, eliminating the need for a fixture. In one embodiment, the pattern is a rectangle displayed on a physical medium or on a computer display. In some embodiments, the pattern is surrounded by a border having reference landmarks or other features used to orient the captured image.

According to one or more embodiments, the disclosed processes and systems transform the captured image to an ideal coordinate system to compensate for the orientation of the lensmeter relative to the pattern during the image capture process. In some embodiments, the transformation is made with reference to the location of reference landmarks in the captured image relative to the location of reference landmarks in a reference pattern group.

According to one or more embodiments, the disclosed processes and systems process the captured image to determine an overall distortion by detecting and determining the location of a number of captured pattern landmarks in the captured image. The system determines a transformation that describes the distortion from the location of a number of reference pattern landmarks (in the ideal coordinate system) relative to the corresponding captured pattern landmarks in the captured image. An expression of the transformation (e.g., a dioptric power matrix) may be used to determine measurements of the corrective lens, including a spherical power, a cylinder power, and an astigmatism angle. The portion of the overall distortion due to the corrective lens (as opposed to the lens of the lensmeter) may be determined in part by determining at least one focal length of the corrective lens. Other characteristics of the corrective lens may also be measured. The present embodiments are not limited to sphero-cylindrical lenses, and may be suitable for lenses having other characteristics, such as single vision lenses, bifocal lenses, trifocal lenses, progressive lenses, adjustable focus lenses, or lenses that correct for higher order aberrations.

According to one or more embodiments, multiple images may be captured and analyzed to identify an image captured in a preferred position and/or orientation, e.g., where the corrective lens is closest to halfway between the lensmeter and the pattern.

According to one or more embodiments, a lensmeter is provided that includes a camera, a visual display, and a processor configured to carry out the processes described herein. The lensmeter may be a dedicated lensmeter, or may be mobile device (e.g., a smartphone or a tablet device) executing lensmeter software, such as a downloadable app.

FIG. 1 illustrates a conventional optical lensmeter system 100 for determining a prescription and/or other unknown characteristics of a corrective lens 130. A light source 110 is directed through a pattern 120 (e.g., a transparent target having a printed pattern with known dimensions and arrangement) and the corrective lens 130 (and a number of standard and objective lenses, not shown) to an eyepiece 140. A viewer whose eye is engaged with the eyepiece 140 can observe the way that the corrective lens 130 distorts the light passing through the pattern 120. By measuring the distortive effect of the corrective lens 130, the user can determine certain characteristics of the corrective lens 130, including the spherical power, cylindrical power, and axis measurements of the corrective lens 130. The lensmeter system 100 requires a fixture 150, including a lens holder 152, to maintain the pattern 120, the corrective lens 130, and the eyepiece 140 in a precisely spaced and oriented arrangement. The optical principles underlying the operation of the lensmeter system 100 require that the specific spacing and orientation be maintained by the fixture 150.

Similarly, digital lensmeters can be used to image a pattern through a single corrective lens, and use the distortion in the image to determine a prescription and/or other unknown characteristics of a corrective lens. Like conventional optical lensmeters, currently available digital lensmeters require a fixture for holding the corrective lens, the lensmeter lens, and the pattern in a precisely spaced and oriented arrangement.

Figure 2:
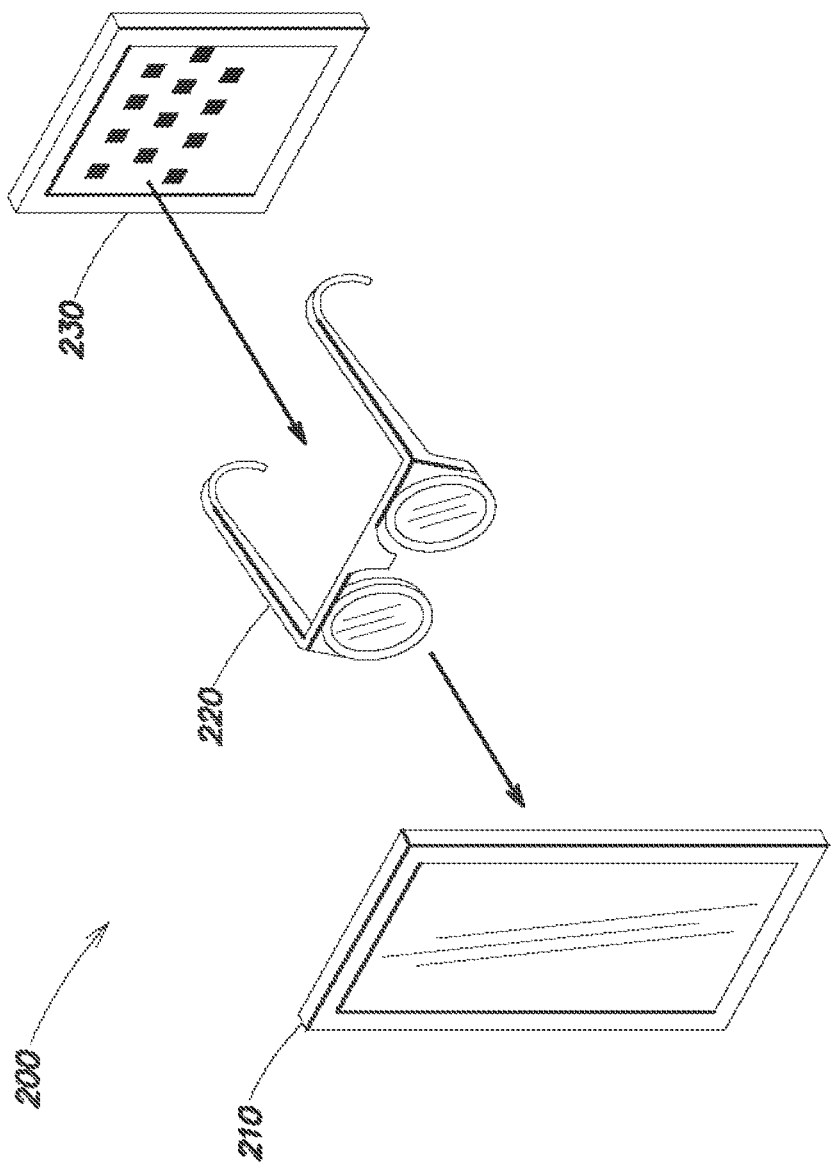
FIG. 2 is a block diagram of a lensmeter system according to one or more embodiments.

FIG. 2 illustrates a block diagram of a lensmeter system 200 according to one or more embodiments. In the embodiments shown in FIG. 2, the system 200 includes a lensmeter 210, a corrective lens 220, and a pattern 230. In operation, the lensmeter 210 captures an image of the pattern 230 through the corrective lens 220. The corrective lens 220 distorts the light emitted by, or reflecting off the pattern 230 into the lensmeter 210, and the distortive effect may be measured in order to determine one or more unknown characteristics of the corrective lens 220, including the sphere, cylinder, and axis measurements.

The captured image of the pattern 230 is normalized by converting it to an ideal coordinate system using reference landmarks near the pattern 230. The normalization compensates for rotation, tilt, or distance variances in the spacing and orientation among the lensmeter 210, the corrective lens 220, and the pattern 230. No fixture is therefore required in the lensmeter system 200. The normalized pattern 230 can then be compared to a reference pattern, also in the ideal coordinate system, and the distortive effect of the corrective lens can be isolated from the distortive effect of the lens of the lensmeter 210 itself.

In some embodiments, the pattern 230 is displayed on an electronic display (not shown), such as a computer monitor, tablet or other mobile device, or the like, or is projected onto a surface by a projector. For example, the pattern 230 may be provided on a website accessible by the lensmeter system 200, or may be provided by or through a mobile app running on a mobile device. In other embodiments, the pattern 230 is printed on a physical medium such as a piece of paper or plastic.

In some embodiments, two or more patterns may be used to allow for determining the characteristics of two or more corrective lenses simultaneously. In a preferred embodiment, two spaced patterns are used, with each pattern 230 being a rotation-variant checkerboard grid of alternating black and white squares, where the number of rows in the checkerboard differs from the number of columns by 1. This rotation-variant quality allows the lensmeter 210 to determine whether the pattern 230 is being viewed in a correct, upright position, or alternately is rotated on its side. In one embodiment, the pattern 230 is a black-and-white checkerboard design having eight (8) rows and seven (7) columns.

In another embodiment, the pattern 230 has 16 rows and 15 columns. Other configurations or color combinations are also possible.

Figure 3:
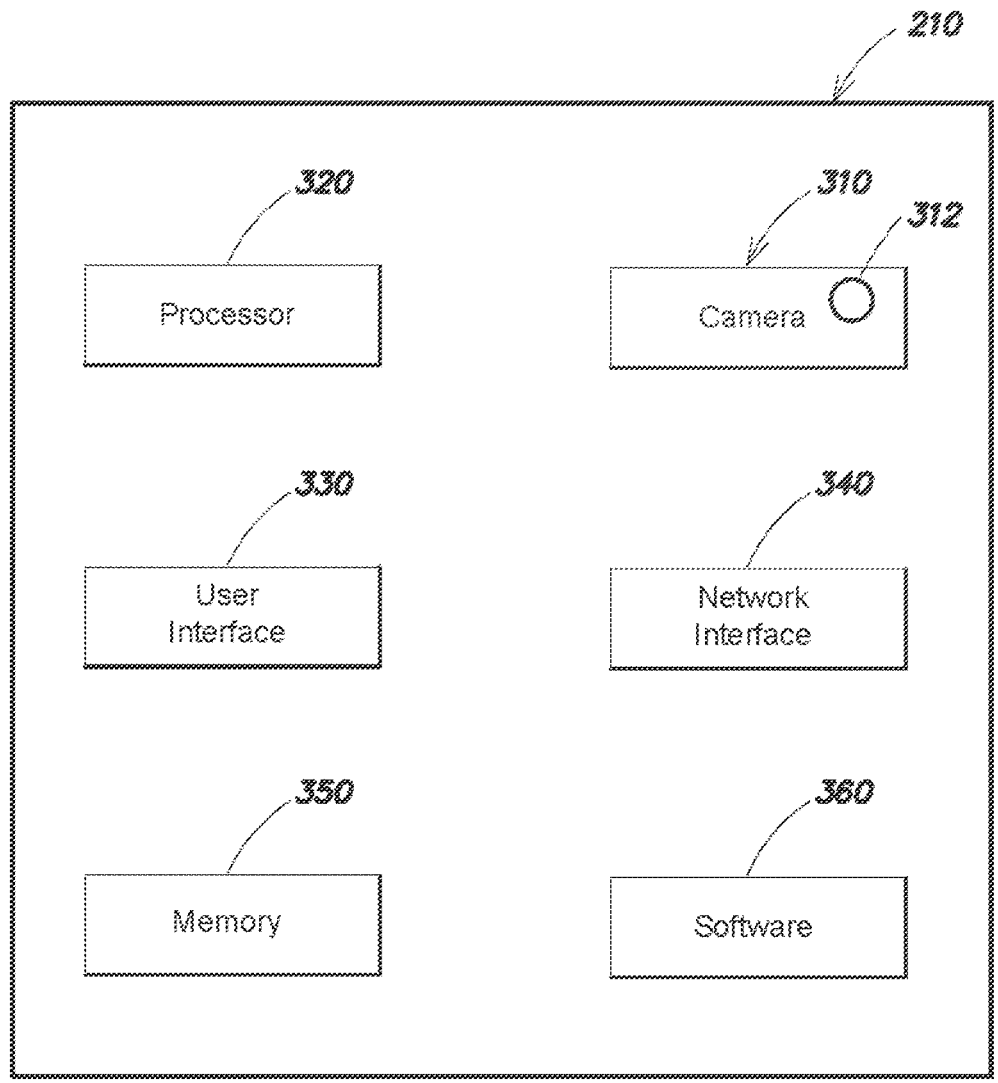
FIG. 3 is a block diagram of a mobile device lensmeter according to one or more embodiments.

FIG. 3 is a block diagram of a lensmeter 210 according to some embodiments. In some embodiments, the lensmeter 210 is a consumer mobile device (e.g., a smartphone or tablet device) or computer (e.g., a laptop computer) running specialized software to perform the operations described herein. In other embodiments, the lensmeter 210 is a dedicated lensmeter device. The lensmeter 210 includes a camera 310 having a lens 312, and further includes a processor 320, a user interface 330, a network interface 340, a memory 350, and lensmeter software 360. In some embodiments, the camera 310 is an integral component of the lensmeter 210. In other embodiments, the camera 310 may be an add-on component or accessory. The processor 320 is coupled to the camera 310 and executes software 360 for the image capturing functions performed by the lensmeter 210. In some embodiments, the functionality of the lensmeter 210 may be performed in conjunction with other devices as part of a broader lensmeter system. For example, in an embodiment where functionality of the lensmeter 210 is performed by a user's smartphone, the smartphone may be paired with the user's laptop computer in order to control the display of the patterns. In that example, the lensmeter 210 may be considered to include both the user's smartphone and the laptop computer.

The user interface 330 receives input from, and provides output to, a user of the lensmeter 210. In some embodiments, the user interface 330 displays to the user the image currently visible through the lens 312 of the camera 310, allowing the user to adjust the position or orientation of the lensmeter 210. In some embodiments, the user interface 330 provides the user with a physical or on-screen button to interact with in order to capture an image. In other embodiments, the image is captured automatically when the pattern 230 is detected in the image and certain alignment, size, lighting, and resolution conditions are met.

The user interface 330 may also provide indications to the user to move any of the lensmeter 210, the corrective lens 220, and the pattern 230 to a different absolute position or orientation, or to a different position or orientation relative to each other. For example, the user interface 330 may provide directions such as "MOVE FORWARD," "MOVE BACKWARD," "TILT LENSMETER FORWARD," instructions conveyed with graphics and illustrations, or other such directions, until the user has positioned the lensmeter 210 such that the corrective lens 220 is positioned at an optimal, known position relative to the lensmeter 210 and the pattern 230; and until the lensmeter 210, the corrective lens 220, and the pattern 230 are aligned so that the pattern 230 is viewable through the corrective lens 220 at the lensmeter 210. In some embodiments, the user interface 330 and/or other components of the lensmeter 210 may provide such instructions audibly, such as by recorded voice instructions, or by an audible tone emitted at a frequency proportional (or inversely proportional) to the distance of the lensmeter 210 from the correct position. In other embodiments, the user interface 330 may provide an indication to the user once the user has correctly positioned the lensmeter 210, the corrective lens 220, and the pattern 230, for example by displaying a "green light" or thumbs-up icon. The user interface 330 may also allow a user to interact with other systems or components, such as by giving an instruction to transmit corrective lens prescription information to the user's doctor.

In some embodiments, the network interface 340 allows for access to downloads and upgrades of the software 360. In some embodiments, one or more steps of the process described below may be performed on a server (not shown) or other component distinct from the lensmeter 210, and data may be passed between the lensmeter 210 and the server via the network interface 340. The network interface 340 may further allow for automatically uploading lens characteristics or prescription information to another entity, e.g., the user's optometrist or another corrective lens provider.

Some or all of the processes described herein, as well as other functions, may be performed by the lensmeter software 360 executing on the lensmeter 210, or by other systems in communication with the lensmeter 210 (e.g., via the network interface 340).

Figure 4:
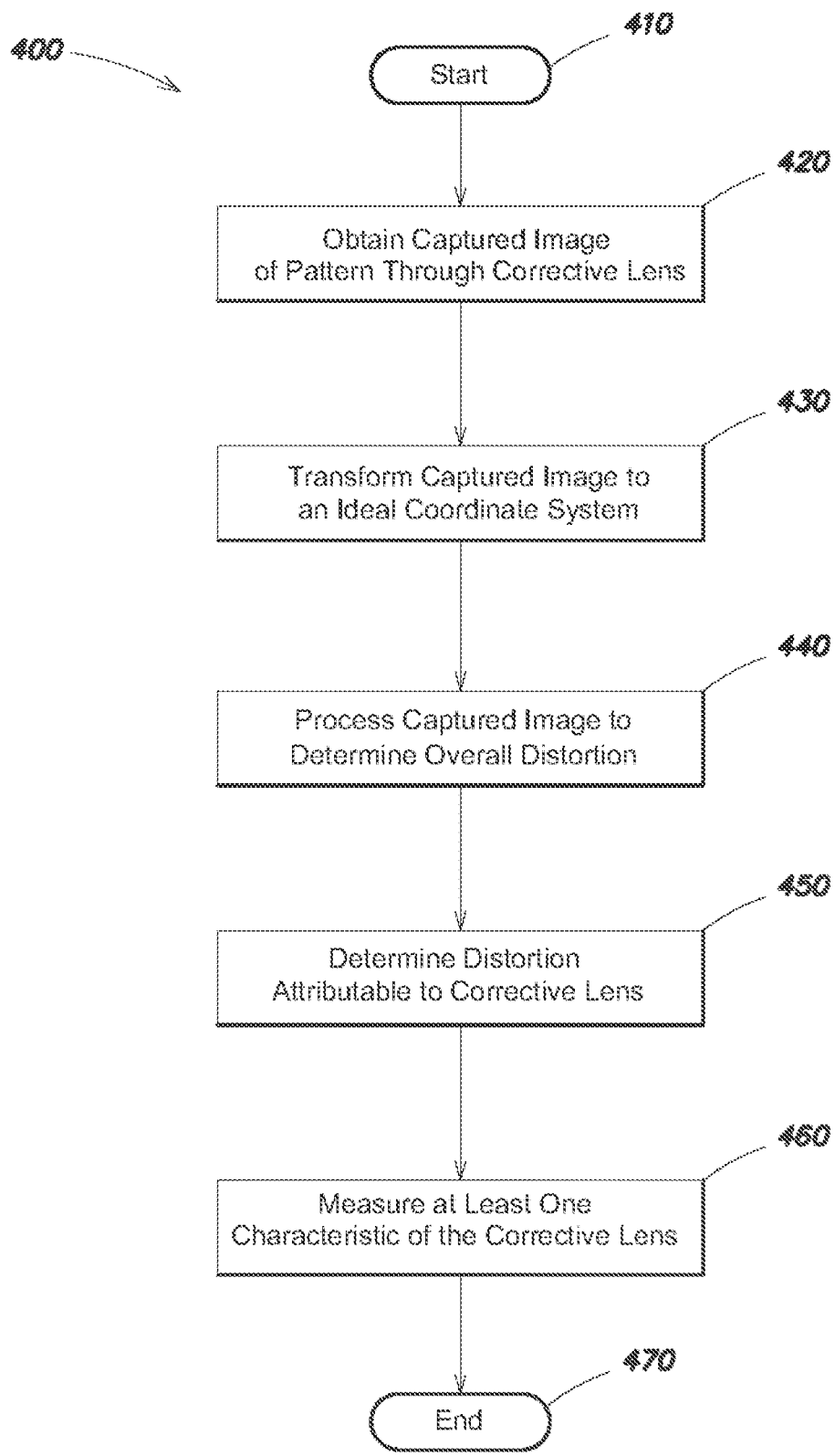
FIG. 4 is a flow chart of a method for operating a mobile device lensmeter according to one or more embodiments.

FIG. 4 is a flow chart of a process 400 for determining characteristics of a corrective lens according to one or more embodiments. Such embodiments may be implemented using a system such as that shown in FIGS. 2 and 3.

The process begins at step 410.

At step 420, a captured image of a pattern is obtained through a corrective lens. The image is captured by a camera (e.g., camera 310). In some embodiments, the camera is part of, or attached to, a dedicated lensmeter device. In other embodiments, the camera is part of a mobile device (e.g., a smartphone or tablet device). In some embodiments, the user is instructed to hold the mobile device with the camera oriented toward the pattern such that the pattern is viewed through the corrective lens. An image of the pattern is then captured by the camera. The image may be captured in response to a user indication, such as clicking a physical button or an interface element on the screen of the mobile device. In other embodiments, the image may be captured automatically once a stable, relatively static image has been obtained and is in focus, and the lensmeter, corrective lenses, and pattern are appropriately aligned. For example, an accelerometer of the mobile device may be used to determine that the camera is relatively still. If a focused image can be obtained, the system may attempt to discern the presence of the pattern within the image using known image processing and detection techniques. In some embodiments, multiple images may be captured, and an image may be selected for further processing from among the multiple images based on such criteria as the image in which the pattern is most in focus, whether the elements are appropriately aligned, or the like.

In some embodiments, the object may be an image displayed on a computer display. The object may be a pattern with a known geometry and easily detectable feature points. According to some embodiments a checkerboard pattern is used.

Figure 5A:
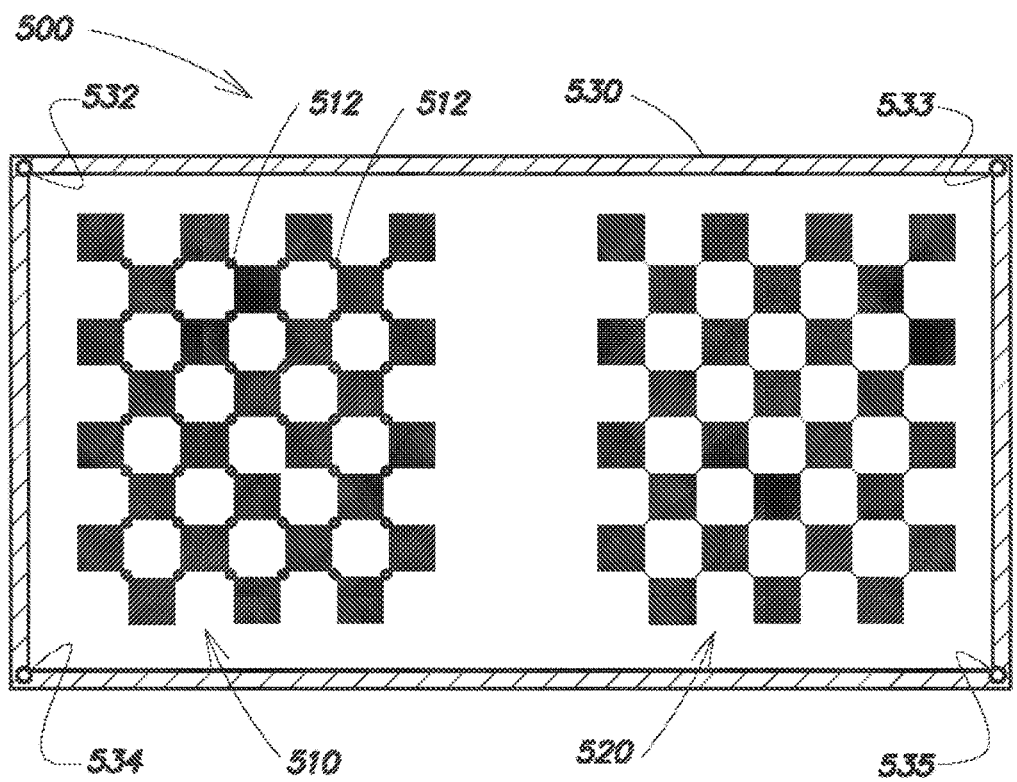
FIG. 5A is an illustration of a reference pattern group according to one or more embodiments.

FIG. 5A illustrates a pattern group 500 in which patterns 510, 520 are positioned to be used in simultaneously detecting characteristics of two corrective lenses, such as two eyeglass lenses within an eyeglass frame. The patterns 510, 520 are positioned within a border 530. The border 530 includes border reference landmarks 532, 533, 534, 535 at known locations relative to the border 530. The border 530 and/or the border reference landmarks 532, 533, 534, 535 are used to correct the orientation of the captured image in subsequent steps. In a preferred embodiment, four border reference landmarks are used, though some embodiments may use as few as two border reference landmarks. In one embodiment, a border reference landmark 532, 533, 534, 535 is located in each of the four interior corners of the border 530. The border reference landmarks 532, 533, 534, 535 may be markers recognizable in the captured image using computer vision techniques, or may be inherent landmarks detected by computer vision techniques and/or with reference to the known geometry of the pattern group 500. For example, if it is known that the border 530 is a rectangle having four interior corners, those four interior corners may be located and used as the border reference landmarks 532, 533, 534, 535.

The patterns 510, 520 also include a plurality of pattern reference landmarks 512. The locations of the plurality of pattern reference landmarks 512 in the captured image are used in subsequent steps to determine the nature of the distortion introduced by the corrective lens. In some embodiments, a pattern reference landmark 512 is located at adjoining corners of squares within a checkerboard pattern. The pattern reference landmarks 512 may be markers recognizable in the captured image using computer vision techniques, or may be landmarks detected by computer vision techniques and/or with reference to the known geometry of the pattern group 500.

The locations of the border reference landmarks 532, 533 and the pattern reference landmarks 512 are known in the pattern group 500. Those known locations allow the pattern group 500 to be used as a reference pattern group in subsequent steps, against which the locations of those same points in captured images may be compared.

In some embodiments, the lensmeter is configured to operate when the corrective lenses in an eyeglass frame are halfway between the lensmeter and the patterns 510, 520. The patterns 510, 520 are configured and spaced such that each of the patterns 510, 520 is aligned with both the lensmeter and one of the corrective lenses when the corrective lenses are halfway between the lensmeter and the patterns 510, 520. Such an arrangement can be achieved, for example, when the distance between the centers of the patterns 510, 520 is twice as large as the distance between the centers of the corrective lenses. For example, if the distance between the centers of corrective lenses in an eyeglass frame is 77.5 mm, then the patterns 510, 520 may be spaced such that the distance between the centers of the patterns 510, 520 is 77.5×2=155 mm.

The patterns 510, 520 and/or the border 530 are sized and configured such that, when the lensmeter captures an image of the patterns through the corrective lenses, the openings in a normal-sized eyeglass frame wholly surround the patterns in the captured image, meaning the patterns are completely overlaid by the corrective lenses. The openings of the eyeglass frame are in turn wholly contained within the border 530. The captured image can be considered as having one or more first regions created from light passing through (i.e., distorted by) the corrective lenses, and one or more second regions created from light passing around (i.e., undistorted by) the corrective lenses.

Figure 5B:
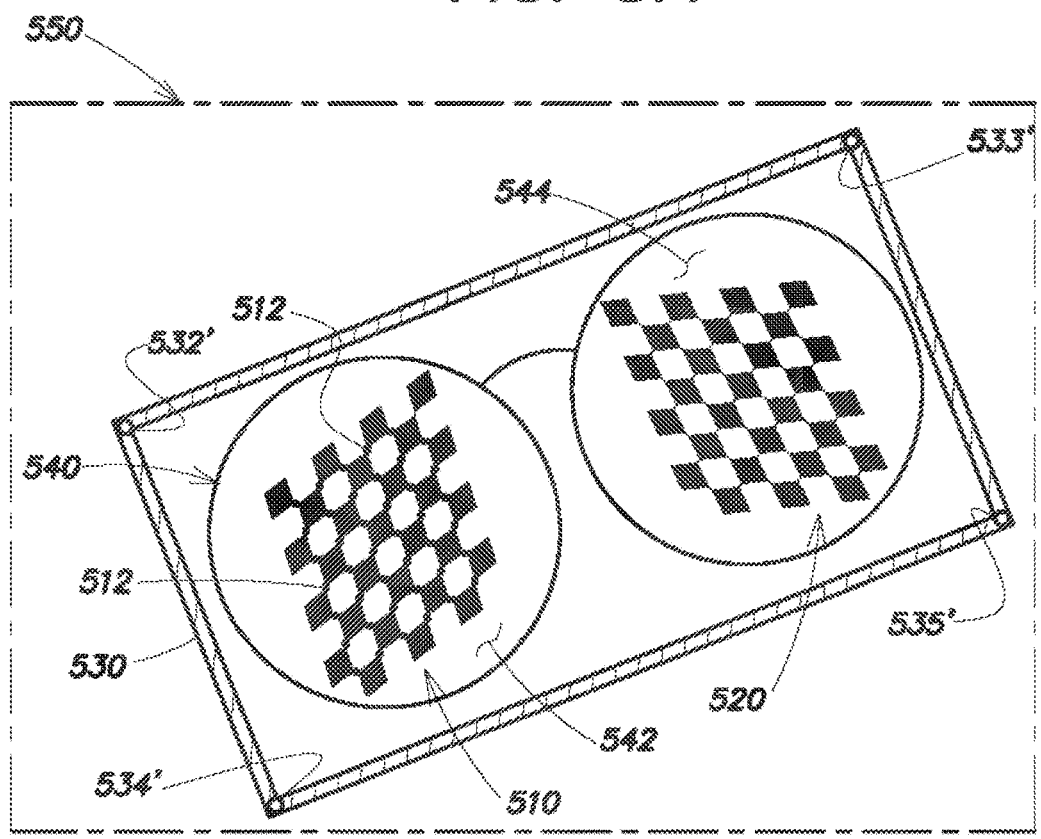
FIG. 5B is an illustration of a captured image of the reference pattern group of FIG. 5A according to one or more embodiments.

A captured image 550 illustrating such a configuration can be seen in FIG. 5B. The pattern 510 is wholly contained within an opening 542 of an eyeglass frame 540, and the pattern 520 is wholly contained within an opening 544 of the eyeglass frame 540. The patterns 510, 520 in the captured image 550 have been distorted by the corrective lenses in the eyeglass frame 540. The eyeglass frame 540 is wholly contained within the border 530. By employing such a configuration, the distortion of the patterns 510, 520 in the captured image due to the corrective lenses can be measured, whereas the border reference landmarks 532, 533 remain undistorted.

It will be appreciated that the pattern group 500 illustrated in FIGS. 5A and 5B is for illustrative purposes, and different configurations, sizes, or types of patterns and/or borders may be employed, or omitted altogether, within the scope of the disclosure. In some embodiments, more than one image may be captured, with each image cropped or otherwise limited to contain only one pattern. In other embodiments, one image of both patterns is captured, and the image split into two images for parallel processing on each pattern in subsequent steps. In still other embodiments, video clips of the patterns may be captured, or multiple static images captured in rapid succession.

It will also be appreciated that lenses having different characteristics will distort the pattern in the captured image in different ways. For example, lenses with positive powers will magnify the pattern in the captured image, causing the pattern to appear larger through the corrective lens. In that situation, the pattern may be sized such that the pattern in the captured image is not too large to be fully bounded by the corrective lens. Similarly, lenses with negative powers will diminish the pattern in the captured image, causing the pattern to appear smaller through the corrective lens. In that situation, the pattern may be sized such that the pattern in the captured image is not too small to be identified and processed in identified in later steps. Accordingly, in some embodiments the pattern may be displayed on a display device allowing the pattern size to be configured according to the characteristics of the lens or other considerations. In some embodiments, the user may be provided an interface (either via the display device or the lensmeter 210) to resize the pattern, or to select a characteristic of the lens and cause a suitably-sized pattern to be displayed. In other embodiments, the pattern may be resized automatically by the system so that it is the correct size in the captured image.

As can be seen in the captured image 550 in FIG. 5B, the border 530 is rotated counter-clockwise from the horizontal rectangular configuration show in FIG. 5A, and the patterns 510, 520 and border 530 in FIG. 5B are smaller than their counterparts in FIG. 5A. These variations make it difficult to directly compare the pattern group 500 of the captured image 550 to the reference pattern group 500.

Therefore, returning to FIG. 4, at step 430, the captured image is transformed to an ideal coordinate system. In some embodiments, the captured image is transformed to the ideal coordinate system represented by the reference pattern group 500 of FIG. 5A. This transformation may involve rotating, resizing, cropping, and skewing the image to remove any distortions or imprecisions introduced by the image capture process. In some embodiments, the captured image is transformed to an ideal coordinate system by detecting the border reference landmarks 532', 533', 534', 535' in the captured image 550, and transforming the captured image 550 using image manipulation techniques to cause the border reference landmarks 532', 533', 534', 535' to appear in the same location in the captured image as the corresponding border reference landmark 532, 533, 534, 535 in the reference pattern group 500 of FIG. 5A. The border reference landmarks 532', 533', 534', 535' may be detected by computer vision techniques, and the border reference landmarks 532', 533', 534', 535' or the pixels constituting them may be configured to have a shape, color, or other characteristic suitable for performing such computer vision techniques.

In some embodiments, a matrix transform is determined from the distance between the border reference landmarks 532, 533, 534, 535 in the captured image 550 and the corresponding border reference landmarks 532, 533, 534, 535 in the reference pattern group 500 of FIG. 5A. The matrix transform is then applied to some or all of the pixels of the captured image 550 in order to effect the transformation.

Figure 5C:
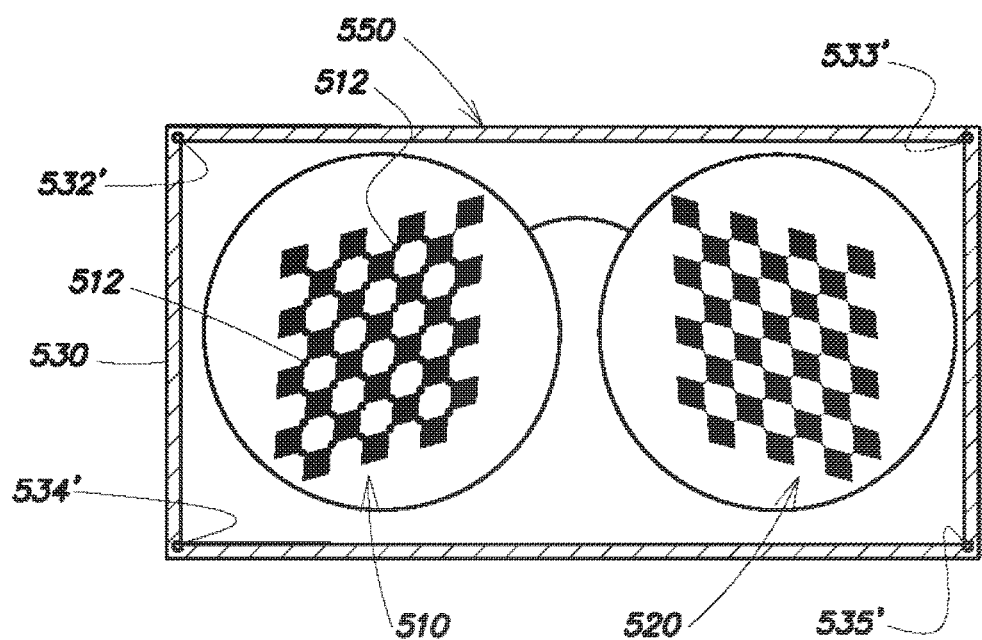
FIG. 5C is the captured image of FIG. 5B after transformation to an ideal coordinate system.

The captured image 550 as it appears after transformation to the ideal coordinate system can be seen in FIG. 5C. The border reference landmarks 532', 533', 534', 535' in this transformed captured image 550 are in the same location as the border reference landmarks 532, 533, 534, 535 in the reference pattern group 500 of FIG. 5A.

At step 440, the captured image is processed to determine an overall distortion from a reference pattern to the pattern of the captured image. The overall distortion (i.e., the distortion introduced by the corrective lens as well as the lens of the camera used to capture the image) may be determined by comparing the patterns 510, 520 in the captured image 550 to the patterns in the reference pattern group 500. In some embodiments, the comparison is performed by comparing the plurality of pattern reference landmarks 512' in the captured image 550 to the plurality of pattern reference landmarks 512 in the reference pattern group 500.

Figure 6:
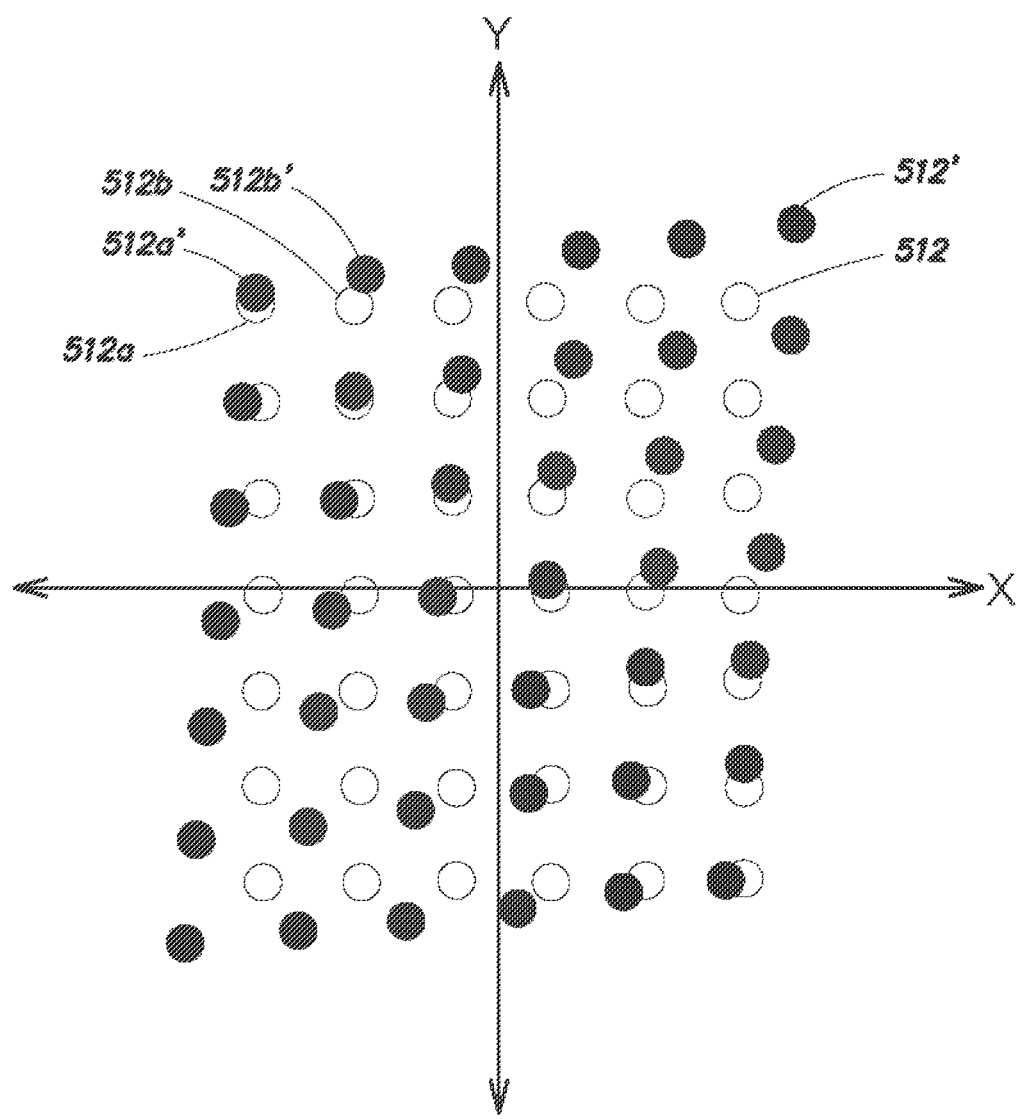
FIG. 6 illustrates a number of pattern landmarks for a reference pattern group and a pattern of a captured image according to one or more embodiments.

FIG. 6 illustrates the locations of the plurality of pattern reference landmarks 512' in an exemplary captured image 550 overlaid over the locations of the plurality of pattern reference landmarks 512 in the reference pattern group 500. The distance between each pattern reference landmark 512a', 512b' in the captured image and its corresponding reference landmark 512a, 512b in the reference pattern group may be used to determine a dioptric power matrix P that describes the distortion (i.e., transformation) from the ideal coordinate system to the captured image.

Prentice's Rule describes the amount of induced prism in a lens. P can be used to express Prentice's Rule in matrix form as $x_{test}=Px_{ref}$, where $x_{test}$ is a matrix of the location of the pattern reference landmark 512a', 512b' in the captured image, and where $x_{ref}$ is a matrix of the location of the corresponding reference landmark 512a, 512b in the reference pattern group.

The dioptric power matrix P is given by:

$$P = \begin{bmatrix} P_x & P_t \\ P_t & P_y \end{bmatrix} \quad [1]$$

where:

$$P_x = S + C \sin^2\theta \quad 2$$

$$P_y = S + C \cos^2\theta \quad 3$$

$$P_t = -C \sin\theta \cos\theta \quad 4$$

Solving algebraically allows for the determination of values for S, a value related to the spherical power of the lens; C, a value related to the cylinder power of the lens; and θ, the astigmatism angle of the lens.

The values of S and C describe the distortion introduced into the captured image by both the corrective lens and the lens of the camera of the lensmeter. Therefore, at step 450, the distortion of the pattern in the captured image attributable to the corrective lens is determined. In particular, the focal lengths of the corrective lens along two orthogonal axes corresponding to θ and θ+90°, $f_\theta$ and $f_{\theta+90°}$, are determined by the following equations when the corrective lens is located at the halfway location between the camera and the pattern:

$$f_\theta = \frac{l}{4}\left(\frac{S}{S-1}\right) \quad [5]$$

$$f_{\theta+90°} = \frac{l}{4}\left(\frac{S+C}{S+C-1}\right) \quad [6]$$

where l is the distance between the pattern and the lens of the camera of the lensmeter. To determine the value of l, parameters of the camera and/or lens where l is the distance between the pattern and the lens of the camera of the lensmeter. To determine the value of l, parameters of the camera and/or lens may be determined or directly accessed from a data store. In some embodiments, the focal length f of the camera lens may be determined from metadata in the captured image, or in configuration information for the lensmeter. The height h of the patterns may be known. The distance l may be determined from f and other parameters. Methods and systems for determining a distance from an object (e.g., the pattern) are described in U.S. patent application Ser. No. 14/996,917, titled "SMARTPHONE RANGE FINDER" and filed on Jan. 15, 2016, the entire disclosure of which is hereby incorporated by reference in its entirety.

At step 460, at least one characteristic of the corrective lens is determined. In some embodiments, the sphere, cylinder, and axis measurements of the corrective lens may be determined, allowing for the prescription of the corrective lens to be determined. The sphere measurement indicates the amount of lens power measured in diopters. Corrective lenses may be prescribed a certain sphere value to correct nearsightedness or farsightedness in all meridians of the eye. In some embodiment, the sphere value may be signed, with a negative value representing a nearsightedness prescription and a positive value representing a farsightedness prescription.

The cylinder value indicates the amount of lens power prescribed for astigmatism. The cylinder value may be zero if no correction is prescribed for astigmatism. A cylinder measurement indicates that the corrective lenses have a first meridian with no added curvature, and a second meridian, perpendicular to the first meridian, that contains a maximum lens curvature to correct astigmatism.

The axis value described the orientation of the second meridian of the cylinder. The axis value may range from 1° to 180°, with 90° corresponding to the vertical meridian of the eye, and 180° corresponding to the horizontal meridian.

Other values may also be determined for the corrective lenses, such as an ADD value representing an added magnifying power applied to the bottom part of a multifocal (e.g., bifocal or trifocal) lens.

In some embodiments, the sphere, cylinder, and axis measurements of the corrective lens may be determined by the following equations:

$$SPH = 1000/f_\theta \quad 7$$

$$CYL = 1000\left(\frac{1}{f_{\theta+90°}} - \frac{1}{f_\theta}\right) \quad [8]$$

$$AXIS = 180° - \theta \quad 9$$

wherein the determination of AXIS is carried out from the perspective of a wearer of the corrective lens.

The values of SPH, CYL, and AXIS may be displayed on a screen of the lensmeter, may be stored in a memory (e.g., a database, or a file) of the lensmeter, and/or may be delivered via the network interface of the lensmeter to another party, such as an eye doctor affiliated with an owner of the corrective lenses, for verification or for filling of the prescription. For example, the processes may be performed by a person who has eyeglasses but does not know the prescription of those glasses. Information obtained through the methods discussed herein may be transmitted to the person's eyecare professional, who can use the information to order a new set of eyeglasses with the proper prescription.

The process 400 ends at step 470.

In some embodiments, the requirement that the corrective lenses be located halfway between the lensmeter and the pattern may be relaxed. The lensmeter and/or the corrective lenses may instead be moved relative to each other and the pattern, with the lensmeter capturing multiple images. For each image, values of S and C may be determined as discussed above. It is known that S and S+C have an extreme value (i.e., a minimum or maximum) when the corrective lenses are positioned halfway between the lensmeter and the pattern. The image for which S and S+C generate an extreme value may be used as the basis for the processes described herein.

It will also be appreciated that, although the examples given here involve corrective lenses in the form of eyeglasses, the processes and systems may be applicable to other types of corrective lenses, such as contact lenses, assuming the contact lenses can be held in a suitable orientation and location for performance of the claimed processes.

In some embodiments, the captured image is not transformed to an ideal coordinate system. Rather, two images are captured: a first image in which the corrective lens is disposed between the lensmeter and the pattern, as discussed in various embodiments herein, and a second "reference" image, identical to the first except that the corrective lens has been removed. Because the distortive effect of the lens is not present in the second image, the first image may be compared directly to the second image to determine the amount of distortion using the techniques discussed with respect to step 440 in process 400.

As discussed above (e.g., in connection with Equations 1-9), it can be helpful in fixtureless lensmeter operations for the corrective lens to be placed halfway between the lensmeter camera and a displayed pattern. However, it can be challenging for a user to find the appropriate halfway location.

As further noted above, the requirement that the corrective lens be located halfway between the lensmeter and the pattern may be relaxed if the lensmeter and/or the corrective lenses are moved relative to each other and the pattern, with the lensmeter capturing multiple images during the movement for identification of extreme values for S and S+C, to identify one of the multiple images in which the corrective lens is located at the halfway location.

However, it can be computationally expensive (e.g., in terms of CPU cycles, memory usage, and/or power) to capture, store, and/or process the multiple images to identify the extrema of S and S+C.

In accordance with various aspects of the subject disclosure, improved lensmeter systems and methods are provided in which the distance, l, between the pattern and the lens of the camera of the lensmeter and the distance, l1, between the pattern and the corrective lens, and/or the distance, l2 (e.g., l-l1) between the corrective lens and the pattern can be determined. Using one or more of these determined distances, the user can be guided to place the corrective lens at the halfway location (e.g., l1=l2) before an analysis image is captured, and/or the lensmeter can compensate for the relative positions of the lensmeter, the corrective lens, and the pattern.

The distances l, l1, and/or l2 can be determined by first determining the absolute size and shape of the corrective lens using a supplemental measurement image (sometimes referred to herein as a contact image or a first image) captured with the corrective lens in contact with the pattern. FIGS. 7-11 illustrate various aspects of a fixtureless lensmeter operation using a contact image.

Figure 7:
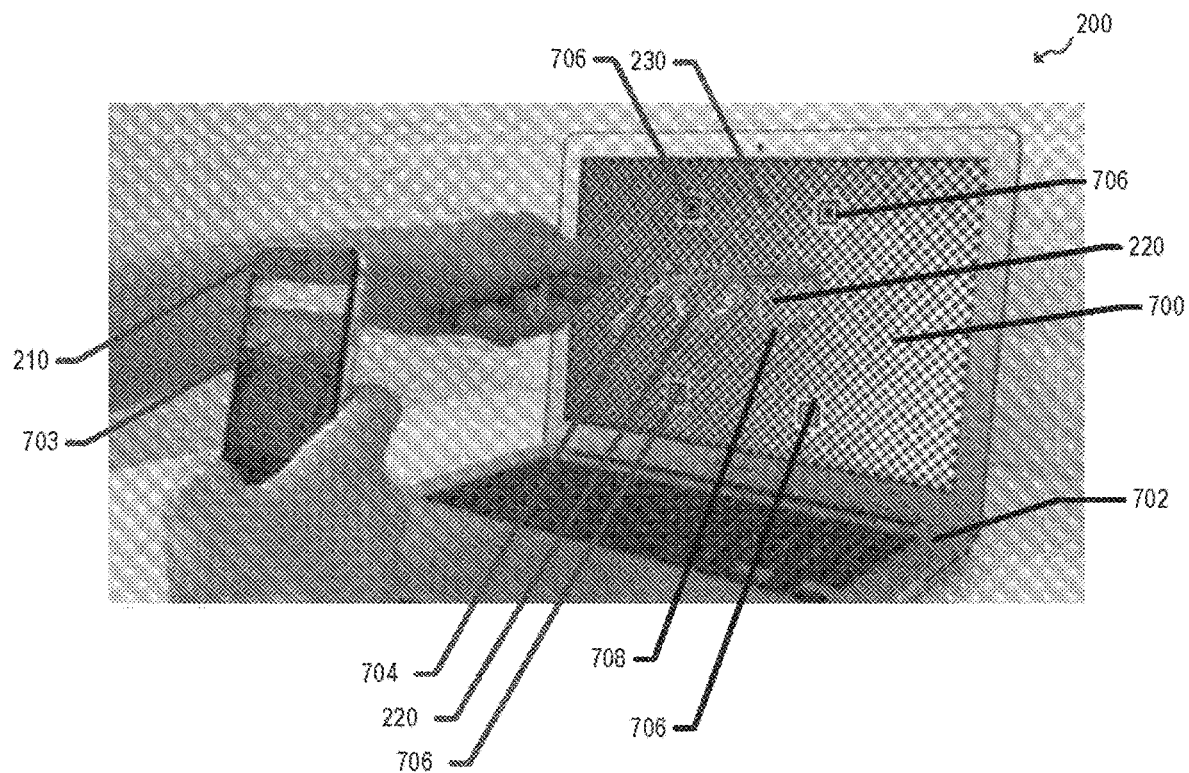
FIG. 7 illustrates a perspective view of a fixtureless lensmeter system in a first configuration in accordance with various aspects of the disclosure.

For example, FIG. 7 shows a perspective view of system 200 in which lensmeter 210, two corrective lenses 220 mounted in a frame 708 of a pair of eyeglasses 704, and pattern 230 are arranged for capture of a contact image. In the example of FIG. 7, pattern 230 is displayed in a display image 700 on a laptop computer 702. Laptop computer 702 may be paired with lensmeter 210 (implemented in this example as a mobile phone). Lensmeter 210 may obtain display features for the display of laptop 702 from laptop 702 and may provide instructions to laptop 702 to control the display of image 700 and/or pattern 230.

For example, lensmeter 210 may obtain information associated with the display of laptop 702 such as dimensional information indicating the size (e.g., height and width) of the display of laptop 702 and/or the pixel size and density of the display. Using this information, lensmeter 210 can determine and/or instruct laptop 702 to adjust the absolute physical size of the features of pattern 230. In the example of FIG. 7, a single, screen-wide pattern 230 is displayed with embedded reference landmarks 706. In this example, reference landmarks 706 may be utilized as border reference landmarks (e.g., for orientation and transformation of captured images) as described above in connection with border reference landmarks 532, 533, 534, and 535. In this example, pattern reference landmarks such as pattern reference landmarks 512 can be provided within pattern 230 and/or features of the pattern (e.g., interfacing corners of pattern squares or other shapes) can be used as pattern reference landmarks.

In the operation illustrated in FIG. 7, while corrective lenses 220 are in contact with pattern 230 (e.g., in contact with the display of laptop 702 while the display shows pattern 230), lensmeter 210 captures a contact image of corrective lenses 220, frame 708, and pattern 230 through corrective lenses 220 and outside of frame 708. In the illustrated configuration, because corrective lenses 220 are in contact with pattern 230, pattern 230 is substantially free of distortion by corrective lenses 220. Accordingly, the sizes of the pattern features in the contact image are known (e.g., and stored in memory 350) and the location of the edges of corrective lenses 220 (e.g., identified by the portions of pattern 230 that are blocked by frame 708) relative to the pattern 230 can be used to determine the absolute size and shape of each corrective lens.

Figure 8:
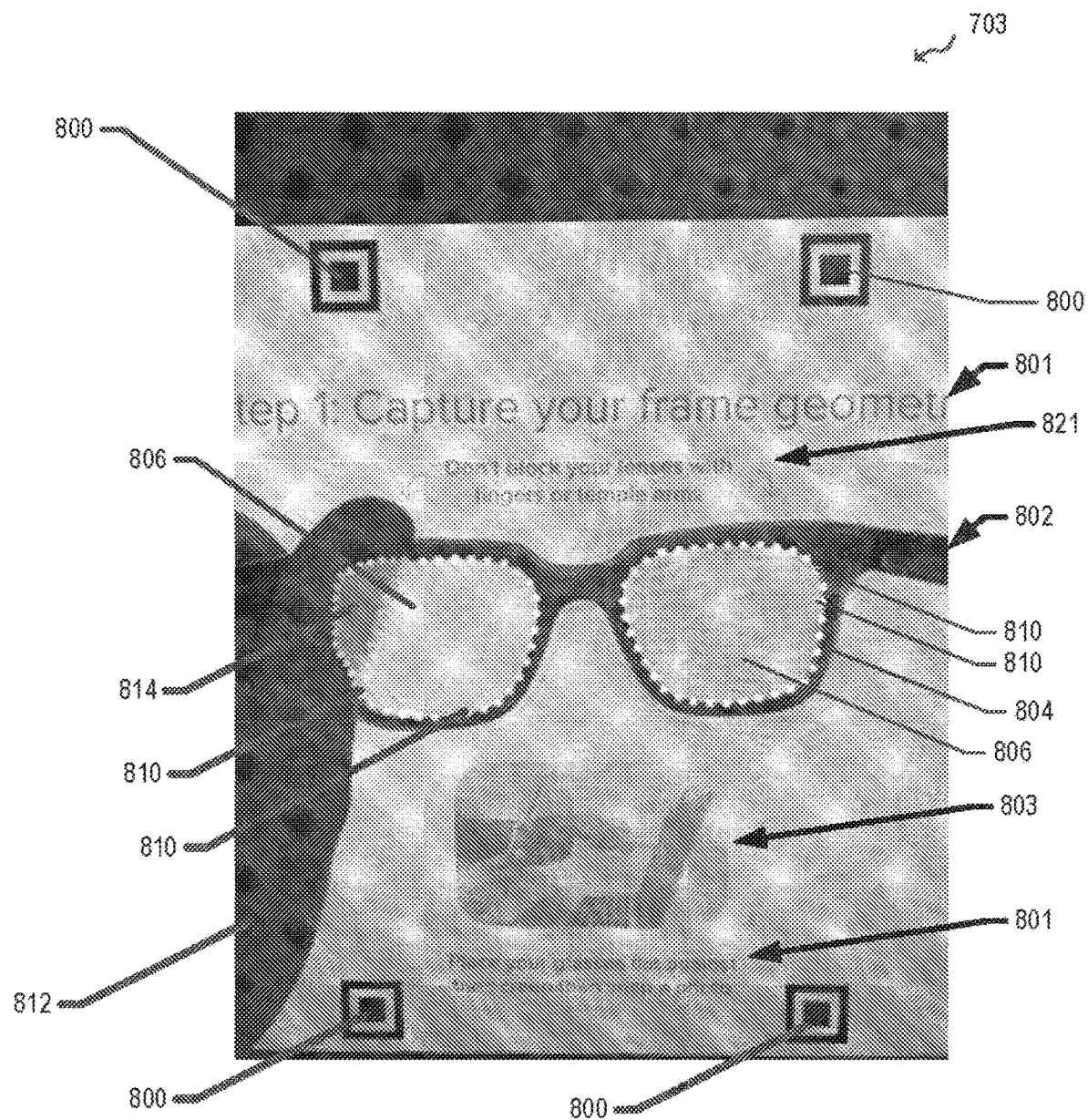
FIG. 8 illustrates top perspective view of a fixtureless lensmeter system in a second configuration in accordance with various aspects of the disclosure.

As indicated in the example of FIG. 7, instructions 703 may be provided on a display of lensmeter 210. In other implementations, instructions 703 may be provided entirely, or in part, on a display of laptop 702 or another device. FIG. 8 illustrates an example of instructions 703 that may be provided during a lensmeter operation using lensmeter 210. As shown in FIG. 8, instructions 703 may include a representation 800 of border reference landmarks 706, and a representation 802 of eyeglasses 704 (including representations 804 and 806 of frame 708 and lenses 220) in position relative to representation 800 of border reference landmarks 706, all based on one or more images captured by the camera of lensmeter 210. As shown, text instructions 801 and/or graphical instructions 803 may be included to instruct the user to place the eyeglasses 704 flat against pattern 230 (e.g., flat against the screen of laptop 702) as in the configuration of FIG. 7, and to capture an image (e.g., snap a photo).

As shown in FIG. 8, lens border indicators 810 may be displayed that indicate the outer boundary of each of corrective lenses 220. For example, spectacles 704 may be segmented from the displayed pattern 230 in an image captured by lensmeter 210, and the shapes corresponding to the lenses 220 may be inferred on the basis of the location and relative size of resulting connected components. Lens border indicators 810 can be generated based on the inferred lens shape, and can then be superimposed on a smartphone's camera view as indicated in FIG. 8 to provide the user with feedback that the lens has been accurately localized.

FIG. 8 also shows how lensmeter 210 may determine whether one or both of lenses 220 is partially occluded (e.g., by the user's finger or a temple arm of the eyeglasses). For example, an occlusion may be detected by comparing the lens shapes for two lenses 220 in a pair of eyeglasses 704 using a shape mirroring and/or alignment procedure. An occlusion may be detected when the mirrored shape of one lens is substantially different (e.g., smaller by more than a threshold) from the shape of the other lens.

The precise localization and shape of the occlusion may be determined by lensmeter 210 by selecting points on the occluded lens shape that fail to match the un-occluded lens shape. The occlusion boundary 814 defined by these selected points can then be superimposed on the smartphone's camera view to inform the user of the nature and location of the occlusion so it can be addressed by the user. Additional instructions 821 may be provided to instruct the user to remove the occlusion (if an occlusion is detected) or remind the user to avoid occluding the lenses.

As described above, when a contact image is captured with system 200 in the configuration of FIG. 7 in which corrective lenses 220 are flat against the pattern 230, the boundaries (indicated in FIG. 8 by boundary indicators 810) can be compared with the known sizes of pattern features in pattern 230 to determine the absolute size and shape of each corrective lens 220.

After capture of the contact image (e.g., response to user action, or automatically as described above), instructions 703 may be changed to instruct the user to move the corrective lenses 220 to a location approximately halfway between lensmeter 210 and pattern 230.

Figure 9:
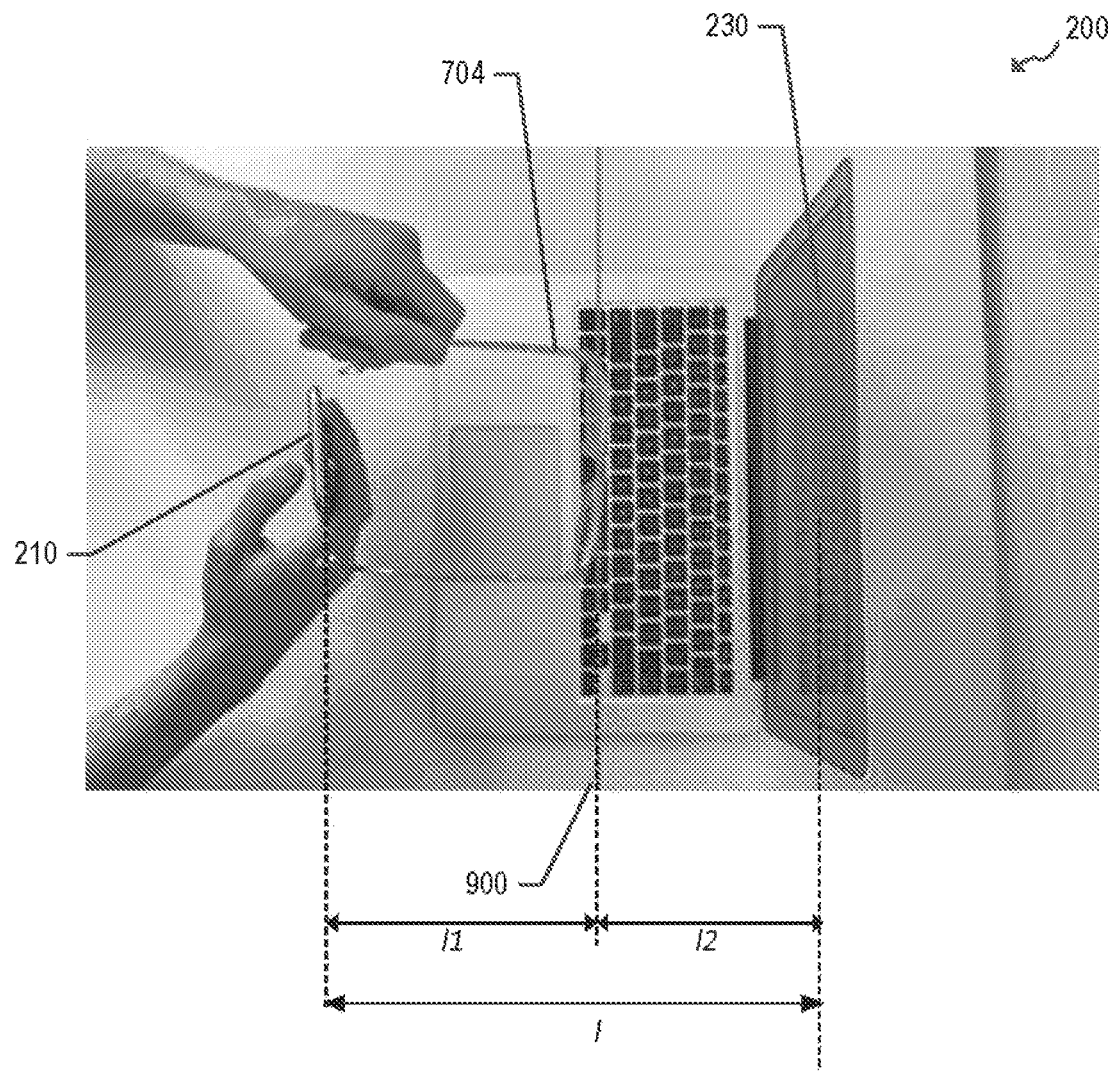
FIG. 9 illustrates a mobile device user-interface view during a fixtureless lensmeter operation in accordance with various aspects of the disclosure.

FIG. 9 illustrates a top perspective view of system 200 in a configuration in which the user has moved eyeglasses 704 such that corrective lenses 220 are located at an intermediate position 900 between lensmeter 210 and pattern 230. FIG. 9 shows the distance, l1, between the pattern 230 and the corrective lenses 220, the distance, l2, between the corrective lenses 220 and the pattern 230, and the total distance, l, between the camera and the pattern.

Images captured during the motion and positioning of corrective lenses 220 can be processed in real time to identify the shapes and sizes of lenses 220 and, by comparison with the shapes and sizes in the contact image, determine the distances l1 and l2. One or more of these determined distances and/or a graphical indicator of the absolute and/or relative distances can be reported back to the user (e.g., using the display of lensmeter 210) in real time, to help the user to guide the spectacles to a desired intermediate position 900 such as a halfway position at which the distance, l1, between the pattern 230 and the corrective lenses 220, and the distance, l2, between the corrective lenses 220 and the pattern 230 are substantially the same (e.g., to within a difference threshold).

Lens border indicators 810 and/or occlusion indicators 814 may also be displayed by lensmeter 210 in real time during the motion and positioning of corrective lenses 220 to indicate to the user the position of corrective lenses relative to reference landmarks 706 and to alert the user if one or more of the lenses is occluded.

When distances l1 and l2 are determined to be approximately the same (e.g., to within a difference threshold) based on the known sizes of lenses 220 from the processing of the contact image (e.g., and no occlusion is detected), lensmeter 210 may provide an indication that the user has correctly positioned the lensmeter 210, the corrective lenses 220, and the pattern 230, for example by displaying a "green light" or thumbs-up icon. When the desired positioning of corrective lenses 220 has been achieved (e.g., at the halfway position), the user may be provided with instructions to capture a lensmeter image (e.g., a lens power measurement image) or the lensmeter image can be captured automatically. The characteristics of lenses 220 are measured (e.g., as described above in connection with FIG. 3) using the captured lensmeter image.

In this way, information obtained during positioning of the lensmeter 210 and the lenses 220 can be reported back to the user in real-time (e.g., with reduced computation and power in comparison with repeatedly computing and comparing S and S+C as described above) to help the user interactively adjust the arrangement of the spectacles and the smartphone in order to achieve the desired imaging conditions. This information (e.g., the relative distances) can also be displayed for the user after capture of a lensmeter image. The lensmeter can then provide an option to retake or accept the lensmeter image, in some implementations.

It should also be appreciated that, although FIGS. 7-9 depict a common pattern across the entirety of the display of laptop 702, in various scenarios, multiple patterns (e.g., two patterns such as patterns 510 and 520 for two lenses of a pair of spectacles, or more than two patterns for progressive or multi-focal lenses) can be used. However, a single pattern as shown and described in connection with FIGS. 7-9 can also be used (e.g., sub-region analysis of captured images) to determine various characteristics of multi-focal, progressive, or other complex lens arrangements. It should also be appreciated that, although a single contact image and a single lensmeter image are described in connection with FIGS. 7-9, in some circumstances, multiple contact images and/or multiple lensmeter images can be captured and aggregated, averaged, or otherwise combined and/or co-processed to provide more accurate results. For example, multiple images can be stacked or otherwise combined for analysis, and/or measurement results from multiple images can be averaged or otherwise combined. For example, the lens power estimation operations described herein are affected by the accuracy of measurements of several quantities, such as the distortion of the test pattern in captured images, and position and orientation of the pattern and lenses relative to the lensmeter device. These measurements may be subject to inaccuracies which are, in part, uncorrelated from one moment to the next. By acquiring a succession of similar images and aggregating the derived estimated measurements, the impact of the temporally uncorrelated noise sources can be mitigated.

Figure 10:
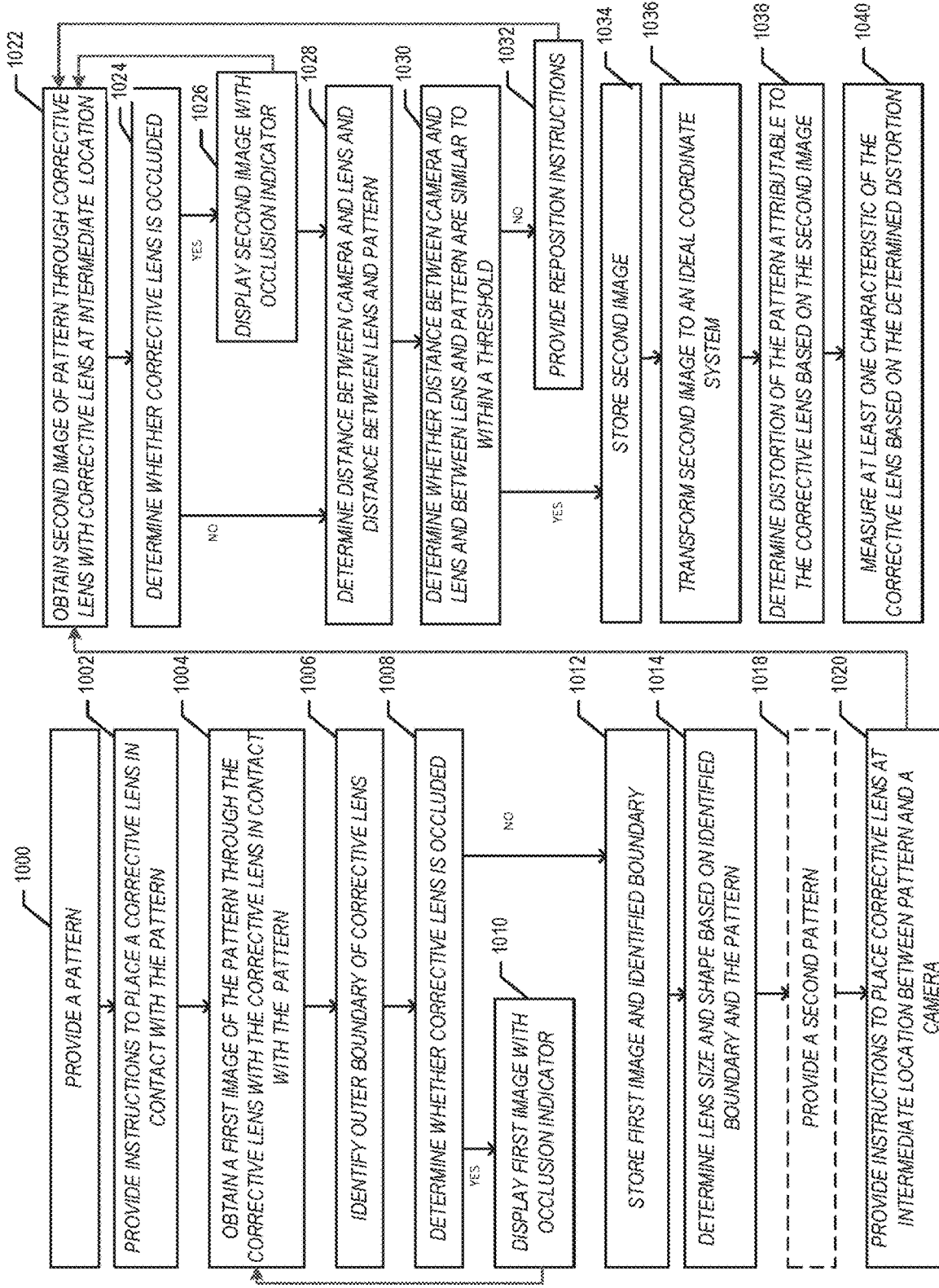
FIG. 10 is a flow chart of illustrative operations that may be performed for a fixtureless lensmeter operation in accordance with various aspects of the disclosure.

FIG. 10 depicts a flow diagram of an example process for lensmeter operations, in accordance with various aspects of the subject technology. For explanatory purposes, the example process of FIG. 10 is described herein with reference to the components of FIGS. 2, 3 and 7-9. Further for explanatory purposes, some blocks of the example process of FIG. 10 are described herein as occurring in series, or linearly. However, multiple blocks of the example process of FIG. 10 may occur in parallel. In addition, the blocks of the example process of FIG. 10 need not be performed in the order shown and/or one or more of the blocks of the example process of FIG. 10 need not be performed.

In the depicted example flow diagram, at block 1000, a pattern such as pattern 230 is provided. As described above, the pattern may be a printed pattern or may be provided by a computing device such as laptop 702 (e.g., by the computing device itself and/or in cooperation with a lensmeter device such a lensmeter device 210 implemented as a mobile phone).

At block 1002, instructions are provided (e.g., using a display of the lensmeter device) to place a corrective lens in contact (e.g., in flat contact) with the pattern (see, e.g., FIGS. 7 and 9). Although the example of FIG. 10 is described in connection with a single corrective lens, the operations of FIG. 10 can be performed for more than one corrective lens, such as for a pair of corrective lenses mounted in a frame.

At block 1004, a first image (e.g., a contact image) of the pattern is obtained (e.g., by a camera of the lensmeter) through the corrective lens with the corrective lens in contact with the pattern. The first image may be obtained by capturing the image with the lensmeter device automatically or responsive to a user's action as described herein.

At block 1006, the lensmeter identifies the outer boundaries of the corrective lens using the first image (e.g., by segmenting the corrective lens and/or a frame for the corrective lens from the pattern in the first image and identifying the location of connected components in the segmented image to obtain points corresponding to the outer boundary). A boundary indicator such as boundary indicator 810 of FIG. 8 may be displayed with a representation of the corrective lens as described above.

At block 1008, the lensmeter determines whether the corrective lens is occluded. Determining whether the corrective lens is occluded may include identifying an irregular edge of a single corrective lens or identifying a shape difference between mirrored shapes of two lenses of a pair of eyeglasses (see, e.g., FIG. 8 and the associated discussion).

If it is determined that the corrective lens is occluded, the lensmeter may display, at block 1010, the first image with an occlusion indicator such as occlusion indicator 814 of FIG. 8 associated with a representation 812 of the user's finger occluding the lens. While occlusion is detected, the lensmeter may continuously return to blocks 1004, 1006, 1008, and 1010 until the occlusion is removed.

If it is determined that the corrective lens is not concluded, at block 1012, the first image and the identified boundary may be stored (e.g., in memory such as memory 350 of the lensmeter).

At block 1014, the size and shape of the corrective lens are determined based on the identified boundary and the pattern. For example, the pattern may be provided with features having a known shape and absolute size so that the absolute dimensions of the corrective lens can be determined by comparison with the features of the pattern in the contact image. For example, if the pattern includes a checkerboard pattern of squares, each having a width of X mm, and the largest dimension of the corrective lens spans Y squares, then the largest dimension of the corrective lens has a length of X*Y mm. One or more additional dimensions of the lens can also be measured. Using this information, the length of the largest dimension of the lens, in image pixels, in any subsequent image can be used to determine the distance between the camera and the corrective lens (e.g., if the pixel solid angle is known). In combination with the pattern features of known size, all distances l, l1, and l2 described above can be determined from the second image.

At block 1018, a second pattern that is different from the first pattern may be provided. The second pattern may include multiple patterns such as patterns 510 and 520 for multiple lenses and/or one or more additional patterns for multi-focal or progressive lenses. However, if desired, the pattern displayed at block 1000 can remain displayed rather than displaying the second pattern.

At block 1020, the lensmeter may provide instructions to place the corrective lens at an intermediate position 900, such as a halfway position, between the camera of the lensmeter device and the pattern.

At block 1022, a second image of the pattern (e.g., the first pattern provided at block 1000 or the second pattern provided at block 1018) through the corrective lens is obtained by the lensmeter with the corrective lens at the intermediate position. The outer boundary of the corrective lens may also be identified in the second image.

At block 1024, the lensmeter determines whether the corrective lens is occluded.

If it is determined that the corrective lens is occluded, the lensmeter may display, at block 1026, the first image with an occlusion indicator such as occlusion indicator 814 of FIG. 8 associated with a representation 812 of the user's finger occluding the lens. While occlusion is detected, the lensmeter may continuously return to blocks 1022, 1024, and 1026 until the occlusion is removed.

If it is determined that the corrective lens is not occluded, at block 1028, the distance l1, between the camera and the corrective lens and the distance, l2 (e.g., l–l1), between the corrective lens and the pattern are determined (e.g., using the known size of the corrective lens as determined at block 1014, the second image, and/or the known size of the features of the pattern).

At block 1030, the lensmeter may determine whether the distance between the lensmeter and the corrective lens and the distance between the corrective lens and the pattern are similar to within a difference threshold (e.g., whether distance l1 is approximately equal to distance l2). In this way, it may be determined whether the corrective lens is at the desired intermediate position (e.g., the halfway position).

If it is determined that the corrective lens is not at the desired intermediate position, at block 1032, reposition instructions may be provided by the lensmeter. For example, the reposition instructions may include a text-based and/or graphical display of the absolute and/or relative distances l1 and l2 and/or an indicator such as a graphical arrow or text instructing the user to move the corrective lens and/or the lensmeter.

While the corrective lens is not at the intermediate position (e.g., as determined by the computation and comparison of the distances l1 and l2), the lensmeter may continuously repeat the operations of blocks 1022, 1024, 1026, 1028, 1030, and/or 1032 until the corrective lens is at the desired intermediate location.

If it is determined, at block 1030, that the corrective lens is at the desired intermediate position, the lensmeter may store, at block 1034, the second image of the pattern through the corrective lens. At block 1030, the lensmeter may also provide an indication to the user that the corrective lens is correctly positioned at the desired intermediate location by providing, for example a "green light" or thumbs-up icon.

The second image may then be captured and stored automatically responsive to the detection at the location or responsive to a subsequent image capture action by the user. In this way, the operations of blocks 1030 and 1032 may help guide the user to place the corrective lens at the halfway location between the camera and the pattern, for optimal measurements. However, it should also be appreciated that the operation of blocks 1030 and 1032 may be omitted or truncated in some scenarios and the distance(s) determined at block 1028 can be used to account for differences in the distortion of the pattern caused by the position of the corrective lens at different locations between the camera and the pattern.

At block 1036, the second image may be transformed to an ideal coordinate system. For example, the second image may be transformed to the ideal coordinate system represented by the reference pattern group 706 of FIG. 7. This transformation may involve rotating, resizing, cropping, and skewing the second image to remove any distortions or imprecisions introduced by the image capture process. In some embodiments, the second image is transformed to an ideal coordinate system by detecting the border reference landmarks 706 in the second image, and transforming the second image using image manipulation techniques to cause the border reference landmarks in the second image to appear in the same location in the second image as the corresponding border reference landmarks 706 in the reference pattern group. The border reference landmarks in the second image may be detected by computer vision techniques, and the detected border reference landmarks or the pixels constituting them may be configured to have a shape, color, or other characteristic suitable for performing such computer vision techniques.

In some embodiments, a matrix transform is determined from the distance between the border reference landmarks in the second image and the corresponding border reference landmarks 706 in the reference pattern group. The matrix transform is then applied to some or all of the pixels of the second image in order to effect the transformation At block 1038, the second image is processed to determine an overall distortion from a reference pattern to the pattern of the captured image. The overall distortion (i.e., the distortion introduced by the corrective lens as well as the lens of the camera used to capture the image) may be determined by comparing the pattern in the second image to the pattern in the reference pattern. In some embodiments, the comparison is performed by comparing a plurality of pattern reference landmarks such as 512' in the second image to a plurality of corresponding pattern reference landmarks such as pattern reference landmarks 512 in the reference pattern group. The distortion of the pattern in the captured image attributable to the corrective lens may then be determined (e.g., using the determined distance l, where l is determined using the second image and the known sizes of the features of the pattern and/or the determined size of the corrective lens). The distortion of the pattern in the captured image attributable to the corrective lens may be determined using the determined distance l and, when the corrective lens is at the halfway location between the pattern and the camera (e.g., when $l1=l2=l/2$), Equations 5 and 6 above. In circumstances in which the correctively lens is not at the halfway location (e.g., $l1 \neq l2$), the equations for determining the distortion of the pattern in the captured image attributable to the corrective lens are modified as would be understood by one skilled in the art, for determination of the distortion of the pattern in the captured image attributable to the corrective lens.

At block 1040, at least one characteristic of the corrective lens is determined by the lensmeter. For example, the sphere, cylinder, and axis measurements of the corrective lens may be determined, allowing for the prescription of the corrective lens to be determined. Other values may also be determined for the corrective lenses, such as an ADD value representing an added magnifying power applied to the bottom part of a multifocal (e.g., bifocal or trifocal) lens. In some embodiments, the sphere, cylinder, and axis measurements of the corrective lens may be determined by Equations 7, 8, and 9 above. Accordingly, the at least one characteristic of the corrective lens may be determined, at least in part, based on the measured size of the corrective lens.

The values of SPH, CYL, and AXIS may be displayed on a screen of the lensmeter, may be stored in a memory (e.g., a database, or a file) of the lensmeter, and/or may be delivered via the network interface of the lensmeter to another party, such as an eye doctor affiliated with an owner of the corrective lenses, for verification or for filling of the prescription. For example, the processes may be performed by a person who has eyeglasses but does not know the prescription of those glasses. Information obtained through the methods discussed herein may be transmitted to the person's eyecare professional, who can use the information to order a new set of eyeglasses with the proper prescription.

Figure 11:
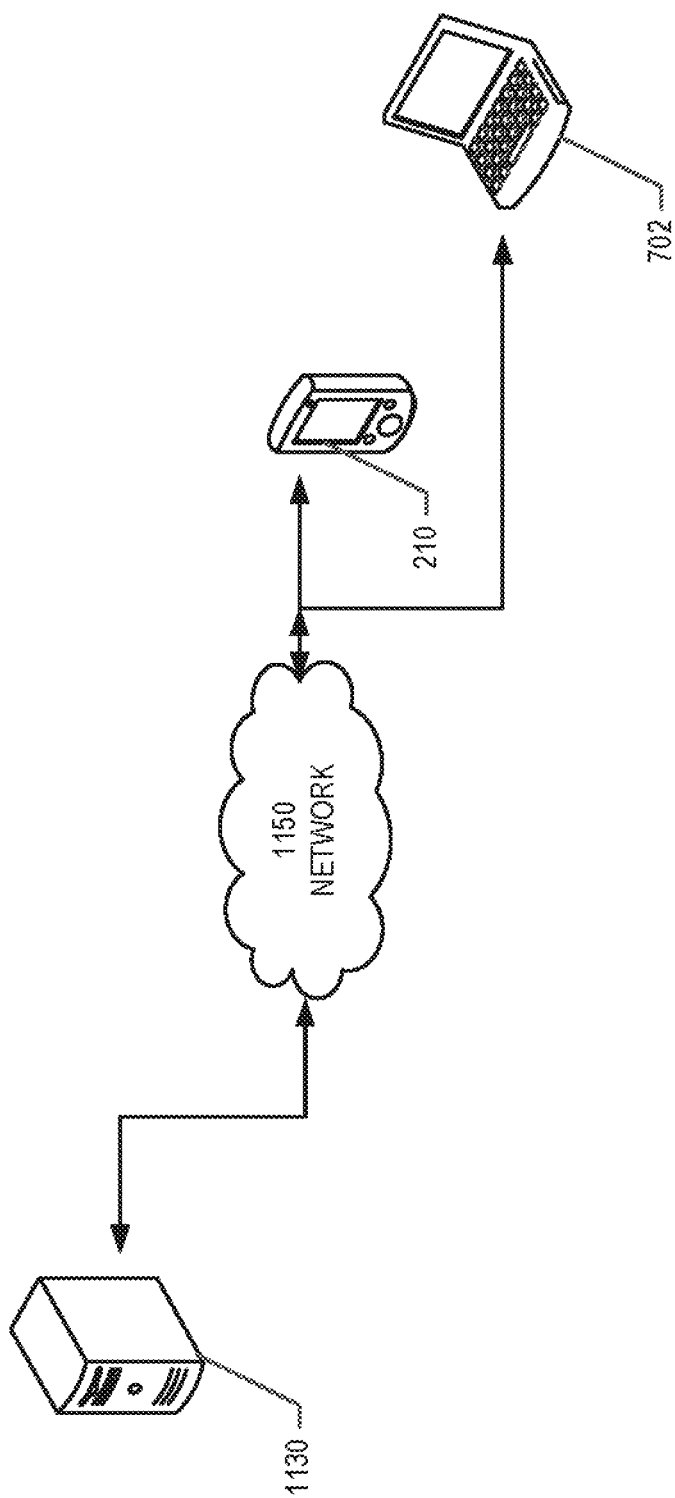
FIG. 11 illustrates an example architecture for a fixtureless lensmeter system suitable for practicing some implementations of the disclosure.

Although various examples are described herein in which lensmeter operations are performed by lensmeter device 210 (e.g., implemented as a mobile phone or smart phone), it should be appreciated that some or all of the lensmeter operations may be performed remotely by a server using images and/or other information captured and transmitted by a mobile device. For example, FIG. 11 shows an implementation of a lensmeter system that includes lensmeter 210 implemented as a mobile phone, a laptop computer 702 for displaying pattern 230, and a server 1130 in communication with lensmeter 210 and/or laptop computer 702 via a network 1150.

As discussed above, aspects and functions disclosed herein may be implemented as hardware or software on one or more of these computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers. Additionally, aspects may be performed on a client-server or multi-tier system that includes components distributed among one or more server systems that perform various functions. Consequently, examples are not limited to executing on any particular system or group of systems. Further, aspects may be implemented in software, hardware or firmware, or any combination thereof. Thus, aspects may be implemented within processes, acts, systems, system elements and components using a variety of hardware and software configurations, and examples are not limited to any particular distributed architecture, network, or communication protocol.

Referring again to FIG. 3, the lensmeter 210 may be interconnected with, and may exchange data with, other systems such as server 1130 via the network interface 340 connected to a network such as network 1150. The network may include any communication network through which computer systems may exchange data. To exchange data using the network, the lensmeter 210 and the network may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the lensmeter 210 may transmit data via the network using a variety of security measures including, for example, TSL, SSL or VPN.

Various aspects and functions may be implemented as specialized hardware or software executing in one or more computer systems. As illustrated in FIG. 3, the lensmeter 210 includes a camera 310, a processor 320, a user interface 330, a network interface 340, a memory 350, and lensmeter software 360.

The processor 320 may perform a series of instructions that result in manipulated data. The processor 320 may be a commercially available processor such as an Intel Xeon, Itanium, Core, Celeron, Pentium, AMD Opteron, Sun UltraSPARC, IBM Power5+, or IBM mainframe chip, but may be any type of processor, multiprocessor or controller. The processor 320 is connected to other system elements, including memory 350, the camera 310, etc.

The memory 350 may be used for storing programs and data during operation of the lensmeter 210. Thus, the memory 350 may be a relatively high performance, volatile, random access memory such as a dynamic random access memory (DRAM) or static memory (SRAM). However, the memory 350 may include any device for storing data, such as a disk drive or other non-volatile storage device. Various examples may organize the memory 350 into particularized and, in some cases, unique structures to perform the functions disclosed herein.

The memory 350 may also include a computer readable and writeable nonvolatile (non-transitory) data storage medium in which instructions are stored that define a program that may be executed by the processor 320. The memory 350 also may include information that is recorded, on or in, the medium, and this information may be processed by the processor 320 during execution of the program. More specifically, the information may be stored in one or more data structures specifically configured to conserve storage space or increase data exchange performance. The instructions may be persistently stored as encoded signals, and the instructions may cause the processor 320 to perform any of the functions described herein. The medium may, for example, be optical disk, magnetic disk or flash memory, among others. A variety of components may manage data movement between the storage medium and other memory elements and examples are not limited to particular data management components. Further, examples are not limited to a particular memory system or data storage system.

The lensmeter 210 also includes one or more user interfaces 330. The user interface 330 may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc.

Although the lensmeter 210 is shown by way of example as one type of a computer device upon which various aspects and functions may be practiced, aspects are not limited to being implemented on the lensmeter 210 as shown in FIGS. 2 and 3. Various aspects and functions may be practiced on one or more computers having a different architectures or components than that shown in FIG. 3. For instance, the lensmeter 210 may include specially programmed, special-purpose hardware, such as for example, an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The lensmeter 210 may include an operating system that manages at least a portion of the hardware elements included in the lensmeter 210. Usually, a processor or controller, such as the processor 320, executes an operating system which may be, for example, a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular implementation.

The processor 320 and operating system together define a computer platform for which application programs in high-level programming languages may be written. These component applications may be executable, intermediate, byte-code or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C #(C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Thus, functional components disclosed herein may include a wide variety of elements, e.g. executable code, data structures or objects, configured to perform described functions.

Embodiments described above utilize a process for determining characteristics of a corrective lens using a camera of a mobile device. Other embodiments may be used to determine characteristics of a lens in a number of different applications including: detecting flaws in a lens; comparing characteristics of two different lenses; determining the structural characteristics of the lens based on the amount of diffraction (i.e., distortion) detected; or other applications that call for determining the characteristics of a lens.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A non-transitory machine-readable medium comprising instructions that, when executed by a processor, cause the processor to perform a method, the method comprising:
    capturing, with a camera, a first image of a pattern through a corrective lens that is in contact with the pattern;
    determining a size of the corrective lens based on the first image and the pattern;
    capturing a second image of the pattern through the corrective lens while the corrective lens is at an intermediate position between the camera and the pattern;
    determining a distortion, attributable to the corrective lens, of the pattern in the second image, using the determined size of the corrective lens; and
    measuring at least one characteristic of the corrective lens based on the determined distortion.

2. The non-transitory machine-readable medium of claim 1, wherein the pattern includes features having a known size, and wherein determining the size of the corrective lens comprises:
    identifying an outer boundary of the corrective lens in the first image; and
    determining a number of the features having the known size that are located within the outer boundary in the first image, wherein the features having the known size that are located within the outer boundary in the first image are free of distortion by the corrective lens due to the contact of the corrective lens with the pattern.

3. The non-transitory machine-readable medium of claim 1, wherein capturing the first image comprises capturing a plurality of first images while the corrective lens is in contact with the pattern, and wherein determining the size of the corrective lens comprises aggregating information associated with the plurality of first images.

4. The non-transitory machine-readable medium of claim 1, wherein the method further comprises receiving information associated with a display of a remote computing device.

5. The non-transitory machine-readable medium of claim 1, wherein the method further comprises determining whether the corrective lens is occluded in the second image.

6. The non-transitory machine-readable medium of claim 5, wherein the method further comprises providing for display, based on the second image, a representation of the corrective lens and an outer boundary of the corrective lens, and an occlusion indicator that indicates an occlusion of the corrective lens.

7. The non-transitory machine-readable medium of claim 6, wherein the corrective lens comprises one of two corrective lenses in a pair of spectacles in the second image, and wherein determining whether the corrective lens is occluded comprises
    determining whether the outer boundary of the corrective lens has a shape that is a mirror of a shape of the other of the two corrective lenses.

8. The non-transitory machine-readable medium of claim 1, wherein the method further comprises, while the corrective lens is at the intermediate position:
    determining a first distance between the corrective lens and the camera using the determined size and the second image; and
    determining a second distance between the corrective lens and the pattern using the determined size and the second image.

9. The non-transitory machine-readable medium of claim 8, wherein determining the distortion using the determined size comprises determining the distortion using at least one of the first distance and the second distance.

10. The non-transitory machine-readable medium of claim 8, wherein the method further comprises:
    providing, for display, at least a representation of the first distance and the second distance; and
    providing an option to retake the second image.

11. The non-transitory machine-readable medium of claim 8, further comprising providing information for display, and based on the first distance and the second distance, the information including directions to move the camera or the corrective lens.

12. The non-transitory machine-readable medium of claim 11, wherein the instructions, when executed by the processor, cause the processor to adapt the directions to movement of the camera or the corrective lens to guide a user to change the intermediate position to a halfway position between the camera and the pattern.

13. A mobile device, comprising:
    a camera; and
    a processor configured to:
    obtain, from the camera, a first image of a pattern through a corrective lens that is in contact with the pattern;
    obtain, from the camera, a second image of the pattern through the corrective lens with the corrective lens at an intermediate position between the camera and the pattern; and
    measure at least one characteristic of the corrective lens based on the first image and the second image by:
        determining a size and shape of the corrective lens based on the first image; and
        determining a distortion of the pattern in the second image, using the determined size and shape of the corrective lens.

14. The mobile device of claim 13, further comprising a network interface, wherein the processor is further configured to communicate with a remote computing device via the networking interface to coordinate display of the pattern by the remote computing device.

15. The mobile device of claim 13, further comprising a display, wherein the processor is further configured to operate the display to:
    provide instructions to place the corrective lens in contact with the pattern and to capture the first image; and
    provide instructions to move the corrective lens to the intermediate position and to capture the second image.

16. The mobile device of claim 13, wherein the processor is further configured to: provide, to a remote computing device, instructions to display the pattern on a
    display of the remote computing device;
    provide, for display by a display of the mobile device, instructions to place the corrective lens in contact with the pattern displayed on the display of the remote computing device; and
    provide, for display by the display of the mobile device, instructions to move the corrective lens to the intermediate position between the camera of the mobile device and the pattern displayed on the display of the remote computing device.

17. A method, comprising:

obtaining, with a mobile device from a camera, a first image of a pattern through a corrective lens that is in contact with the pattern;

obtaining, with the mobile device from the camera, a second image of the pattern through the corrective lens with the corrective lens at an intermediate position between the camera and the pattern; and measuring, with a processor of the mobile device, at least one characteristic of the corrective lens based on the first image and the second image by:

determining, with the processor of the mobile device, a size and shape of the corrective lens based on the first image; and determining, with the processor of the mobile device, a distortion of the pattern in the second image, using the determined size and shape of the corrective lens.

18. The method of claim 17, further comprising displaying, with a display of the mobile device:

instructions to place the corrective lens in contact with the pattern prior to obtaining the first image; and instructions to move the corrective lens to the intermediate position after obtaining the first image and prior to obtaining the second image.

\* \* \* \* \*